United States Patent
Huang et al.

(10) Patent No.: US 11,115,104 B2
(45) Date of Patent: Sep. 7, 2021

(54) ENHANCED SIGNALING AND USE OF MULTIPLE TRANSMISSION CHAINS

(71) Applicant: Intel Corporation, Santa Clara, CA (US)

(72) Inventors: Po-Kai Huang, San Jose, CA (US); Yaron Alpert, Hod Hasharon (IL); Laurent Cariou, Portland, OR (US); Xiaogang Chen, Portland, OR (US); Feng Jiang, Santa Clara, CA (US); Qinghua Li, San Ramon, CA (US); Robert Stacey, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/422,330

(22) Filed: May 24, 2019

(65) Prior Publication Data
US 2019/0349067 A1    Nov. 14, 2019

Related U.S. Application Data

(60) Provisional application No. 62/676,424, filed on May 25, 2018.

(51) Int. Cl.
| | |
|---|---|
| *H04L 5/12* | (2006.01) |
| *H04B 7/06* | (2006.01) |
| *H04B 7/0408* | (2017.01) |
| *H04B 17/309* | (2015.01) |
| *H04L 5/00* | (2006.01) |
| *H04W 72/04* | (2009.01) |

(52) U.S. Cl.
CPC ......... *H04B 7/0697* (2013.01); *H04B 7/0408* (2013.01); *H04B 7/0695* (2013.01); *H04B 17/309* (2015.01); *H04L 5/0025* (2013.01); *H04W 72/046* (2013.01)

(58) Field of Classification Search
CPC .. H04B 7/0697; H04B 17/309; H04B 7/0408; H04B 7/0695; H04L 5/0025; H04W 72/046
USPC ........ 375/262, 261, 260, 259, 316, 219, 295
See application file for complete search history.

(56) References Cited

U.S. PATENT DOCUMENTS

| | | | |
|---|---|---|---|
| 2016/0242210 A1* | 8/2016 | Seok | H04W 28/18 |
| 2017/0181136 A1* | 6/2017 | Bharadwaj | H04W 84/12 |
| 2017/0295560 A1* | 10/2017 | Kim | H04L 5/0055 |
| 2019/0116513 A1* | 4/2019 | Verma | H04W 24/08 |
| 2019/0261369 A1* | 8/2019 | Verma | H04B 7/0619 |

* cited by examiner

*Primary Examiner* — Zewdu A Kassa
(74) *Attorney, Agent, or Firm* — Eversheds Sutherland (US) LLP

(57) ABSTRACT

This disclosure describes systems, methods, and devices related to signaling and use of multiple transmission chains. A device may determine bits indicative of eight or fewer spatial streams. The device may encode the bits by generating an indication of more than eight spatial streams. The device may determine one or more fields of a frame, the one or more fields including the encoded bits. The device may send the frame.

20 Claims, 9 Drawing Sheets

ENHANCED SIGNALING AND USE OF MULTIPLE TRANSMISSION CHAINS

CROSS-REFERENCE TO RELATED APPLICATIONS

This application claims the benefit of U.S. Provisional Application No. 62/676,424, filed May 25, 2018, the disclosure of which is incorporated by reference as if set forth in full.

TECHNICAL FIELD

This disclosure generally relates to systems and methods for wireless communications and, more particularly, to indicating numbers of transmit chains, antennas, and beamforming report segments.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
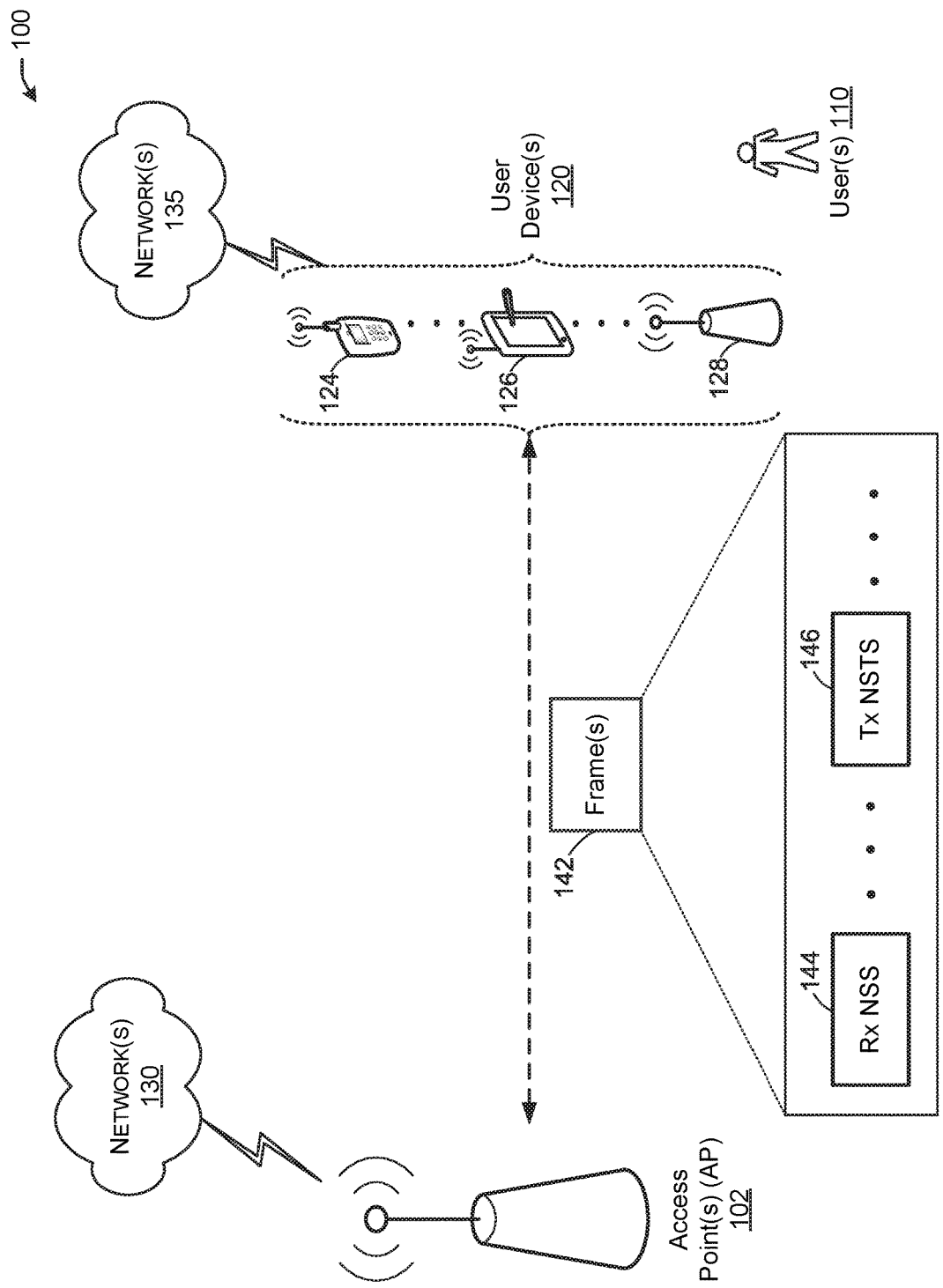
FIG. 1 is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

One of the expected direction for next generation Wi-Fi (e.g., in order to double the throughput and support advance multiple input, multiple output modes) is to extend the maximum number of spatial streams (antennas) support to 16. However, some existing IEEE 802.11 technical standards may use an insufficient number of bits in certain fields of certain frames to indicate transmission and reception capabilities associated with numbers of spatial streams, antennas, beamforming report segments, and other information. For example, some IEEE 802.11 technical standards may use three bits to indicate up to eight spatial streams or antennas. To extend communication support beyond eight spatial streams or antennas, and to allow for more frequency segments, additional bits used in Wi-Fi frames may be needed. However, Wi-Fi devices may be designed to interpret specific bits in specific locations of transmitted frames as communicating particular information, so adding a hit to one field of a frame may result in a receiving device misinterpreting bits in a Wi-Fi frame. There is no previous solution to extend the signaling support for 16 spatial streams or antennas, for example.

In the IEEE 802.11ac technical standard, the sounding protocol, which uses up to eight spatial streams or antennas, uses a sequence in which an AP sends a very high throughput (VHT) NDPA followed by a NDPA frame. STAs may reply with respective VHT compressed beamforming information frames in a sequential manner. In the IEEE 802.11ax technical standard, a sounding protocol may include a beamformer device sending a high efficiency (HE) null data packet announcement (NDPA) frame followed by a null data packet (NDP) frame. In single user (SU) mode, beamformee STAs may reply with respective compressed beamforming information and channel quality indicator (CQI) frames based on the NDP frame. In MU mode, and additional beamforming refinement protocol (BRP) trigger frame may be sent by an AP to solicit compressed beamforming information and CQI frames from beamformee STAs. A beamforming information and channel quality indicator (CQI) frame may include a HE compressed beamforming report field and a HE multiple input, multiple output (MIMO) control field. The HE compressed beamforming report field may carry an indication of the average signal-to-noise ratio (SNR) of each space-time stream and compressed beamforming feedback matrices for use by a transmit beamformer (e.g., a beamformer device using transmit beamforming training) to determine steering matrices.

The HE MIMO control field may include a Nc index field and a Nr index field. The Nc index field may indicate the number of spatial streams supported by a STA. The Nr index field may indicate the number of rows in a compressed beamforming feedback matrix. A Ns field of a HE compressed beamforming report field may indicate the number of subcarriers which a compressed beamforming feedback matrix subfield may send to a beamformer device. As such, a matrix may have a number of rows indicating the number of antennas on a STA, and a number of columns indicating the number of antennas on an AP. In a HE compressed beamforming and CQI frame action field of a compressed beamforming and CQI frame, a HE MIMO control subfield may include a remaining feedback segments field with three bits currently used, and may have up to four reserved bits. The Nc field, the Nr field, the bandwidth field, the resource unit start index field, and the resource unit end index field currently do not support the signaling for more than 8 antennas or spatial streams in the IEEE 802.11 technical standards.

The information in a HE compressed beamforming report field and a HE MU exclusive beamforming report field may be used by a transmit MU beamformer to determine steering matrices. The number of bits for Nc is currently three, and the number of bits for Nr is currently three, therefore more bits may be needed for Nc and Nr to indicate more than eight antennas. A BRP trigger frame currently uses eight bits in a feedback segment retransmission bitmap within a trigger-dependent user subfield. The feedback segment retransmission bitmap may indicate which segment of multiple beamforming report segments an AP is requesting, so to allow for more than eight segments (e.g., when more than eight antennas are available), an additional bit may be needed.

For next generation IEEE 802.11 design, one of the goals is to expand the maximum bandwidth from 160 MHz to 320 MHz and expand the maximum spatial streams from 8 to 16. The increase may result in a significant time increase needed for a beamforming report size, i.e., compressed beamforming information and channel quality indicator (CQI), that is required from a station device (STA) to an access point (AP). A current IEEE 802.11 maximum beamforming report size may 91,632 bytes, which may not be enough to support a 16×16, 320 MHz beamforming report with 133,016 bytes, for example. For a feedback type transmission in a multi-user (MU) environment, the number of required feedback may be at least 1,064,128 bits or 133,016 bytes. The increase may require more beamforming segments to carry the feedback.

NDPA frames may use a sounding dialog token field to indicate whether the sounding is for HE or VHT. NDPA frames also may include STA information subfields for each respective STA. Within a STA information field, 14 bits may be used in a partial bandwidth information subfield, which may use 7 bits to indicate a resource unit start index (e.g., a resource unit of subcarriers) and 7 bits to indicate a resource unit end index. When expanding the bandwidth up to 320 MHz, for example, the corresponding frequency for a resource unit needs to be indicated with the partial bandwidth information field. A STA information subfield also may include a Nc field which may indicate the number of columns in a compressed beamforming feedback matrix, which is limited by the number of spatial streams or antennas on a receiving device side. Therefore, to allow for and signal more than eight antennas, the three bits currently used for the Nc field may be insufficient. A STA information subfield also may include a disambiguation bit (e.g., bit 27) to indicate to a VHT STA to not consider the HE STA information field as its STA information field. The STA information subfield may include a feedback type and Ng subfield and a codebook size subfield which may indicate SU mode, MU mode, CQI feedback only mode, and a quantization resolution.

Example embodiments of the present disclosure relate to systems, methods, and devices for using and signaling multiple transmission chains, antennas, and beamforming report segments.

In one or more embodiments, to allow for and signal the capability of more than eight spatial streams or antennas, or to increase the number of beamforming report segments that a device may send, devices may use bits currently reserved in defined Wi-Fi frame formats, may use other bits allocated to other information in defined Wi-Fi frame formats, may add bits to an existing Wi-Fi frame format, or may define a new field of a Wi-Fi frame in a new format.

In one or more embodiments, to indicate a capability of receiving more than eight spatial streams, a STA may add a bit to the Rx NSS (receive number of spatial streams) field of a medium access control (MAC) frame (e.g., in an operating mode control subfield), may use a reserved bit of a MAC frame, may use another available bit of a MAC frame, or may define a new field with four or more bits to indicate the capability of using more than eight spatial streams for reception. For example, a STA may indicate up to eight receive spatial streams with three bits in currently defined MAC frames, and may need a fourth bit to indicate up to sixteen spatial streams. When a reserved bit of a MAC frame is available, the three bits of the Rx NSS field and the reserved bit may combine for four bits to indicate support of up to 16 spatial streams. When the reserved bit is set to 1, the indicated support of receive spatial streams may be eight plus the indicated value of the Rx NSS field. When the reserved bit is 0, the support of receive spatial streams may be the value of the Rx NSS field.

In one or more embodiments, to indicate a capability of transmitting more than eight spatial streams, a STA may add a bit to the Tx NSTS (transmit number of spatial streams) field of a medium access control (MAC) frame (e.g., in an operating mode control subfield), may use a reserved bit of a MAC frame, may use another available bit of a MAC frame, or may define a new field with four or more bits to indicate the capability of using more than eight spatial streams for transmission. For example, a STA may indicate up to eight transmit spatial streams with three bits in currently defined MAC frames, and may need a fourth bit to indicate up to sixteen spatial streams. When a reserved bit of a MAC frame is available, the three bits of the Tx NSTS field and the reserved bit may combine for four bits to indicate support of up to 16 spatial streams. When the reserved bit is set to 1, the indicated support of transmit spatial streams may be eight plus the indicated value of the Tx NSTS field. When the reserved bit is 0, the support of transmit spatial streams may be the value of the Tx NSTS field.

In one or more embodiments, to indicate a capability of recommending more than eight spatial streams, a STA may add a bit to the NSS (number of spatial streams) field of a medium access control (MAC) frame (e.g., in a high efficiency link adaptation control subfield), may use a reserved bit of a MAC frame, may use another available bit of a MAC frame, or may define a new field with four or more bits to indicate the capability of using more than eight spatial streams for reception. For example, a STA may indicate up to eight spatial streams with three bits in currently defined MAC frames, and may need a fourth bit to indicate up to sixteen spatial streams. When a reserved bit of a MAC frame is available, the three bits of the NSS field and the reserved bit may combine for four bits to indicate support of up to 16 spatial streams. When the reserved bit is set to 1, the indicated support of spatial streams may be eight plus the indicated value of the NSS field. When the reserved bit is 0, the support of spatial streams may be the value of the NSS

FIELD

In one or more embodiments, to indicate a capability of recommending more than eight spatial streams, a STA may add a bit to the Rx NSS (receive number of spatial streams) subfield of an operating mode field of an operation mode notification frame, may use a reserved bit of an operation mode notification frame, may use another available bit of an operation mode notification frame, or may define a new field with four or more bits to indicate the capability of using more than eight spatial streams for reception. For example, a STA may indicate up to eight spatial streams with three bits in a currently defined operation mode notification frame, and may need a fourth bit to indicate up to sixteen spatial streams. When a reserved bit of an operation mode notification frame is available, the three bits of the Rx NSS field and the reserved bit may combine for four bits to indicate support of up to 16 spatial streams. When the reserved bit is set to 1, the indicated support of receive spatial streams may be eight plus the indicated value of the Rx NSS field. When the reserved bit is 0, the support of receive spatial streams may be the value of the Rx NSS field.

In one or more embodiments, to indicate a capability of recommending more than eight spatial streams, an AP may add a bit to the starting spatial stream field and/or the number of spatial streams field of a user information field of a trigger frame, may use a reserved bit of a trigger frame, may use another available hit of a trigger frame, or may define a new field with four or more bits to indicate the capability of using more than eight spatial streams for reception. For example, a STA may indicate up to eight spatial streams with three bits in a currently defined trigger frame, and may need a fourth bit to indicate up to sixteen spatial streams. In one option, the encoding of the starting spatial stream field may be redefined. For example, when the value of the field is v, the indicated value may be x+y*v, where x may be a defined initial point, and y may be a scaling factor (e.g., x may be 2, and y may be 2). In another option, the encoding of the number of spatial streams field may redefined. For example, when the value of the field is v, the indicated value may be x+y*v, where x may be a defined initial point, and y may be a scaling factor (e.g., x may be 2, and y may be 2). Non-linear encoding may be used in which 8 number from 1-16 may be represented by eight possible entries of the field. In another method, a bit may be added to extend the number of spatial streams field. The bit may be a reserved bit, a dual carrier modulation (DCM) bit, or a coding type bit, for example. When a DCM bit or coding type bit is used (e.g., bits from a DCM field or coding type field), the implication may be that the DCM is not used, that binary convolutional coding (BCC) is not used, low-density parity check coding (LDPC) is not used, or that the indication of a DCM field, BCC field, or LDPC field may be combined into a modulation and coding scheme (MCS) field. An additional bit plus the bits for the number of spatial streams field may indicate the number of spatial streams. When the additional bit is set to 1, the indicated number of spatial streams may be eight plus the indicated value of the NSS field. When the additional bit is 0, the support of spatial streams may be the value of the NSS field.

In one or more embodiments, the segmentation of IEEE 802.11 beamforming reporting may be increased (e.g., the number of segments used to provide the beamforming reporting may be increased) to allow for more than eight segmented reports. For example, sixteen or more reports may be allowed. A compressed beamforming and CQI report may be transmitted in a single frame unless the size of the feedback exceeds a size threshold (e.g., 11,454 octets), in which case the feedback may be segmented. When the compressed beamforming and CQI report is split into multiple segments (e.g., multiple transmissions), each feedback segment may be included in a separate frame and may include successive portions of the report, followed by any MU exclusive beamforming report information. Each segment may be the same length except for the final segment, which may be shorter in length (e.g., based on a MAC protocol data unit length).

In one or more embodiments, to increase the number of segments of beamforming reporting beyond eight segments, a new trigger frame may be defined to allow for a number of bits in a feedback segment retransmission bitmap. In one option, an entry in a trigger type field of a common information field of a trigger frame may be used. A trigger-dependent user information field may include at least X bits of a feedback segment retransmission bitmap, wherein X>8. The feedback segment retransmission bitmap subfield may indicate the requested feedback segments of a compressed beamforming report. When the bit in position n (e.g., n=0 for least significant bits and n=X−1 for most significant bits) is one, the feedback segment with the remaining feedback segments equal to n is requested. When the bit in position n is zero, the feedback segment with the remaining feedback segments equal to n is not requested. In another option, the BRP trigger frame signaling may be extended. The trigger-dependent user subfield may include at least X bits of a feedback segment retransmission bitmap, where X>8. The signaling of the new format of the feedback segment retransmission bitmap may indicate to STAs to interpret the trigger-dependent user information field as the new format, and the signaling for the new interpretation may be included in an element of a management frame. The new BRP trigger frame may only include a user information field for next generation STAs that have the capability of recognizing the new format (e.g., the new format may not be used for legacy devices or may indicate to legacy devices that they should ignore the information in the frame).

In one or more embodiments, another option to increase the number of segments of beamforming reporting beyond eight segments may include redefining the feedback segment retransmission bitmap of a BRP trigger frame. The feedback segment retransmission bitmap subfield may indicate the requested feedback segments of a compressed beamforming report. When the bit in position n (e.g., n=0 for least significant bits and n=X−1 for most significant bits) is one, then the feedback segment with the remaining feedback segments equal to 2*n and 2*n+1, if it exists, is requested. When the bit in position n is zero, then the feedback segment with the remaining feedback segments equal to 2*n and 2*n+1 is not requested. The signaling of the new format of the feedback segment retransmission bitmap may indicate to STAs to interpret the trigger-dependent user information field as the new format, and the signaling for the new interpretation may be included in an element of a management frame. The new BRP trigger frame may only include a user information field for next generation STAs that have the capability of recognizing the new format (e.g., the new format may not be used for legacy devices or may indicate to legacy devices that they should ignore the information in the frame). The signaling may use the following bits from a user information field: a reserved bit, a spatial stream (SS) allocation field (e.g., implying that only a fixed number of spatial streams may be used to transmit feedback in response to a BRP trigger frame), a DCM field (e.g., implying that DCM is not used or that DCM is merged into a MCS field with different encoding), or a coding type field (e.g., implying that BCC and/or LDPC is not used, or that a coding type indication is merged with the MCS field with different encoding).

In one or more embodiments, another option to increase the number of segments of beamforming reporting beyond eight segments may include reusing trigger frame subfields in a user information field to solicit feedback segments when there are more than eight segments using any combination of the following bits for the feedback segment retransmission bitmap: a reserved bit, a SS allocation field (e.g., implying that only a fixed number of spatial streams may be used to transmit feedback in response to a BRP trigger frame), a DCM field (e.g., implying that DCM is not used or that DCM is merged into a MCS field with different encoding), or a coding type field (e.g., implying that BCC and/or LDPC is not used, or that a coding type indication is merged with the MCS field with different encoding). The additional bit and the existing eight bits in the trigger-dependent user information field jointly may indicate the feedback segment retransmission bitmap having X bits.

In one or more embodiments, to support more than 8 spatial streams and a bandwidth of more than 160 MHz, NDPA frames may be expanded. In multiple options, the currently defined NDPA frame may be reused with bits 0 and 1 of a sounding dialog token field being set to 1. In one of the options, the STA information field may include six bytes, with bits 27 and 43 used as disambiguation bits set to 1 to indicate to VHT STAs not to consider a next generation STA information field as its VHT STA information field. Bits 5, 6, 37, and 38 may be disambiguation bits for HE STAs and set to 1 to indicate to a HE STA not to consider a next generation STA information field as its HE STA information field. The resource unit start index may be larger than 96, which is larger than what a HE STA currently may support. The disambiguation bits may be bits 4, 6, 36, and 38 (e.g., corresponding to bits 20 and 22 of the resource unit start index field) because the resource unit start index field may be larger than 80, which is the limit that the HE STAs currently may support. Eleven bits may be used for an access identifier (AID) 11 field (e.g., the 11$^{th}$ AID field), and the bits may be used with the same definition as a HE NDPA frame (e.g., the bits may not be contiguous).

In one or more embodiments, still referring to the first option for the NDPA frame expansion, three or four bits may be used for the Nc field. Two bits may be used for the feedback type and Ng (number of groupings) field with a same definition of a HE NDPA frame (e.g., indicating SU feedback, MU feedback, and CQI feedback). The feedback type and Ng field size may be extended and may use non-contiguous bits. One bit may be used for the codebook size field with a same definition of a HE NDPA frame. The codebook size field may be extended to indicate a different quantization error, and the bits may be non-contiguous. An additional grouping field may be used to indicating Ng grouping. The indication may include Ng=4 or Ng=16.

In one or more embodiments, still referring to the first option for the NDPA frame expansion, an additional grouping field may be used to indicate Ng field grouping. An indication may include Ng=4 or Ng=16. An additional feedback type field may be added to the frame to include an indication of SU feedback, MU feedback, or CQI feedback requested, and the field may use non-contiguous bits. The bandwidth information field of the frame may include 16 bits, 8 of which may be used for the resource unit start index subfield to indicate the first 26-tone resource unit for which an HE beamformer device is requesting feedback, and 8 of which may be used for the resource unit end index subfield to indicate the last 26-tone resource unit for which the HE beamformer device is requesting feedback. The bits of the bandwidth information field used for the indications may be non-contiguous.

In one or more embodiments, still referring to the first option for the NDPA frame expansion, a bandwidth field may indicate a channel width used to determine the starting and ending subcarrier indices when interpreting the resource unit start index subfield and the resource unit end index subfield. One entry may indicate a 320 MHz bandwidth or a 160+160 MHz (e.g., non-contiguous) bandwidth. One entry may indicate a 20 MHz bandwidth. One entry may indicate a 40 MHz bandwidth. One entry may indicate a 80 MHz bandwidth. One entry may indicate a 160 MHz or an 80+800 MHz (e.g., non-contiguous) bandwidth. A single bit may be used to indicate whether the bandwidth is 320 MHz or 160+160 MHz, and may allow for the signaling in a bandwidth signaling transmitter address field. The remaining bits of the NDPA frame may be reserved.

In one or more embodiments, a second option for NDPA frame expansion may include redefining fields in a STA information field. For example, the resource unit start index subfield of the partial bandwidth subfield may indicate a first 52-tone resource unit for which an HE beamformer device may request feedback. The resource unit end index subfield may indicate a last 52-tone resource unit for which the HE beamformer device is requesting feedback. A bit, such as bit 26 of the feedback type and Ng field, may be used to extend the Nc field of the frame, which implies that there may be no Ng=4 when requesting SU or MU feedback. When the bit is set to 1, the indicated Nc field value may be equal to 8 plus the value of the Nc field. When the bit is set to 0, the indicated Nc field value may be the value of the Nc field.

In one or more embodiments, the sounding feedback from STAs may be modified based on multiple options. In one option, a STA may use reserved bits in the HE MIMO control filed to extend existing fields. For example, one reserved bit may extend the Nc field. When the bit is set to 1, the indicated Nc field value may be equal to 8 plus the value of the Nc field. When the bit is set to 0, the indicated Nc field value may be the value of the Nc field. One reserved bit may be used to extend the Nr field. When the bit is set to 1, the indicated Nr field value may be equal to 8 plus the value of the Nr field. When the bit is set to 0, the indicated Nr field value may be the value of the Nr field. A reserved bit may be used to extend the bandwidth field. The bit may be used to indicate a 320 MHz or a 160+160 MHz bandwidth. When the bit is set, the bandwidth field may be used for other purposes. When the bit is set, one of two bits may be used to extend the resource unit start index field. For example, when the two bits are set, the resource unit start index may equal 128 plus the value of the resource unit start index field. When one bit is set, then one of the two bits may be used to extend the resource unit end index field. When both bits are set, the resource unit end index may be 128 plus the value of the resource unit end index field. The reserved bit may be combined with the bandwidth field to provide a joint indication of the bandwidth field.

In one or more embodiments, still referring to the first option of the modified sounding feedback from STAs, the resource unit starting index field may be redefined to indicate the starting resource unit index of the first 52-tone resource unit for which an HE beamformer device is requesting feedback. The resource unit end index field may be redefined to indicate the last resource unit index of the first 52-tone resource unit for which the HE beamformer is requesting feedback. One reserved bit may be used to extend the remaining feedback segments field. When the bit is set, the remaining feedback segments field may be 8 plus the value of the remaining feedback segments field. A reserved bit may be used to extend the grouping field. For example, when the bit is set, the grouping field may indicate two additional Ng fields grouped.

In one or more embodiments, a second option for modifying the sounding feedback from STAs may include designing a new compressed beamforming and CQI action frame to enable signaling for operations with 16 antennas and 320 MHz. The new frame may reuse an existing HE frame format or may be different. An entry in the action field of the frame may indicate whether the frame is a next generation compressed beamforming and CQI frame format, which may be according to the format shown in Table 1 below.

TABLE 1

Next Generation Compressed Beamforming and CQI Frame Format.

| Order | Information |
|---|---|
| 1 | Category |
| 2 | Next generation action field or HE action field |
| 3 | Next generation MIMO control |
| 4 | Next generation compressed beamforming report or HE compressed beamforming report |
| 5 | Next generation MU exclusive beamforming report or HE MU exclusive beamforming report |
| 6 | Next generation CQI-only report or HE CQI-only report |

Referring to Table 1, a next generation report may refer to an extremely high throughput (EHT) frame designed for EHT devices. Therefore, a beamforming report may be a HE compressed beamforming report, an EHT compressed beamforming report, a MU exclusive beamforming report, an EHT MU exclusive beamforming report, a CQI-only report, a HE CQI-only report, or an EHT CQI-only report, depending on the number of spatial streams, antennas, and/or bandwidth used and indicated by one or more frames as described herein.

In one or more embodiments, still referring to the new compressed beamforming and CQI action frame, for next generation MIMO control, the frame may include a Nc field, a Nr field, a bandwidth field, a grouping field, a codebook information field, a feedback type field, a remaining feedback segments field, a first feedback segment, a resource unit start index, a resource unit end index, a sounding dialog token number field, and other fields. The Nc field may include 3 or 4 bits. The Nr field may include 4 bits. The bandwidth field may include 3 bits. The grouping field may include at least one bit. The codebook information field may include at least one bit. The feedback type field may include at least two bits. The remaining feedback segments field may include at least 4 bits. The first feedback segment field may include at least one bit. The resource unit start index field and the resource unit end index field each may include at least 7 bits. The sounding dialog token number field may include at least 6 bits.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an exemplary network environment, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 4:
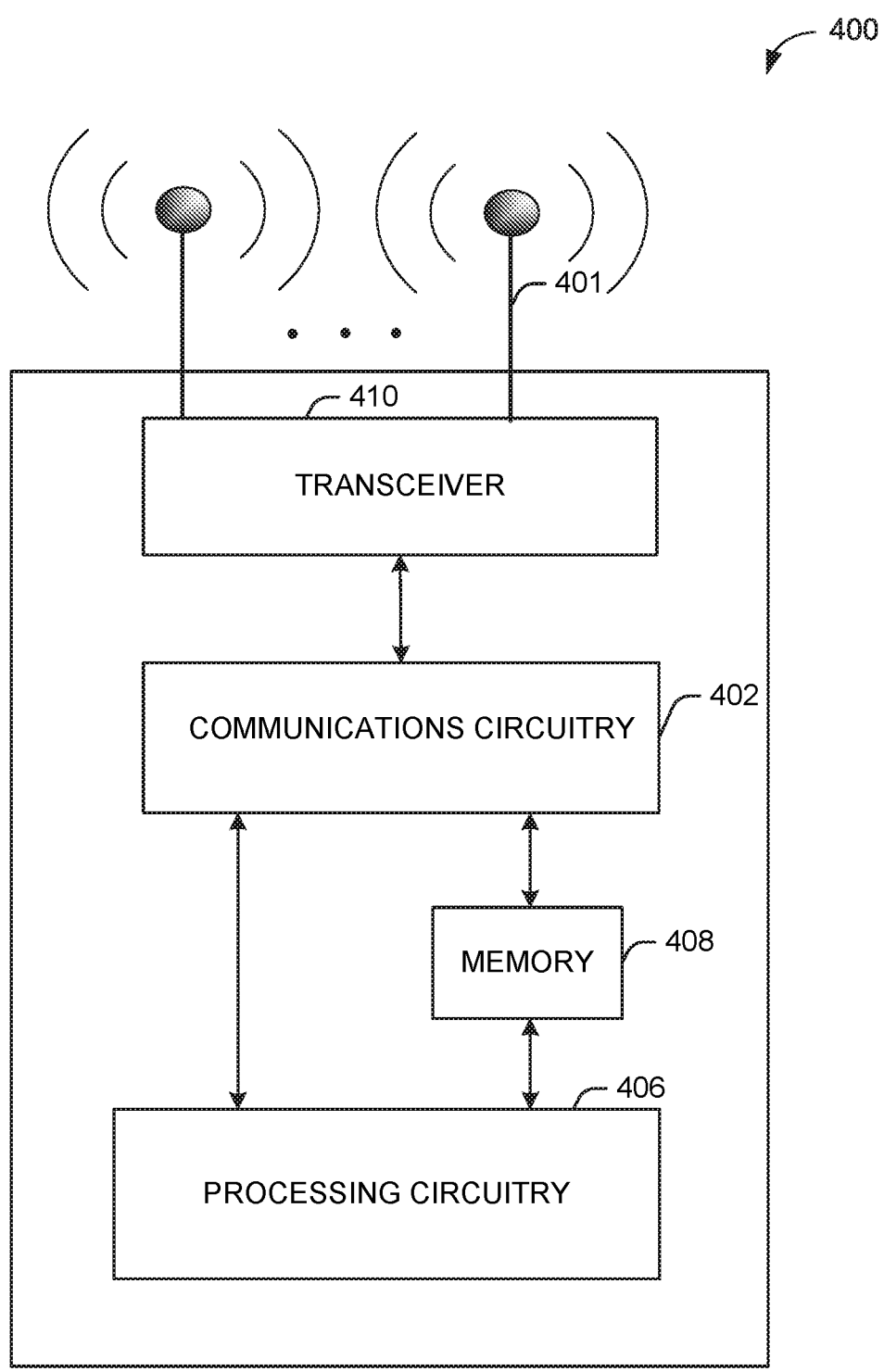
FIG. 4 illustrates a functional diagram of an exemplary communication station that may be suitable for use as a user device, in accordance with one or more example embodiments of the present disclosure.
Figure 5:
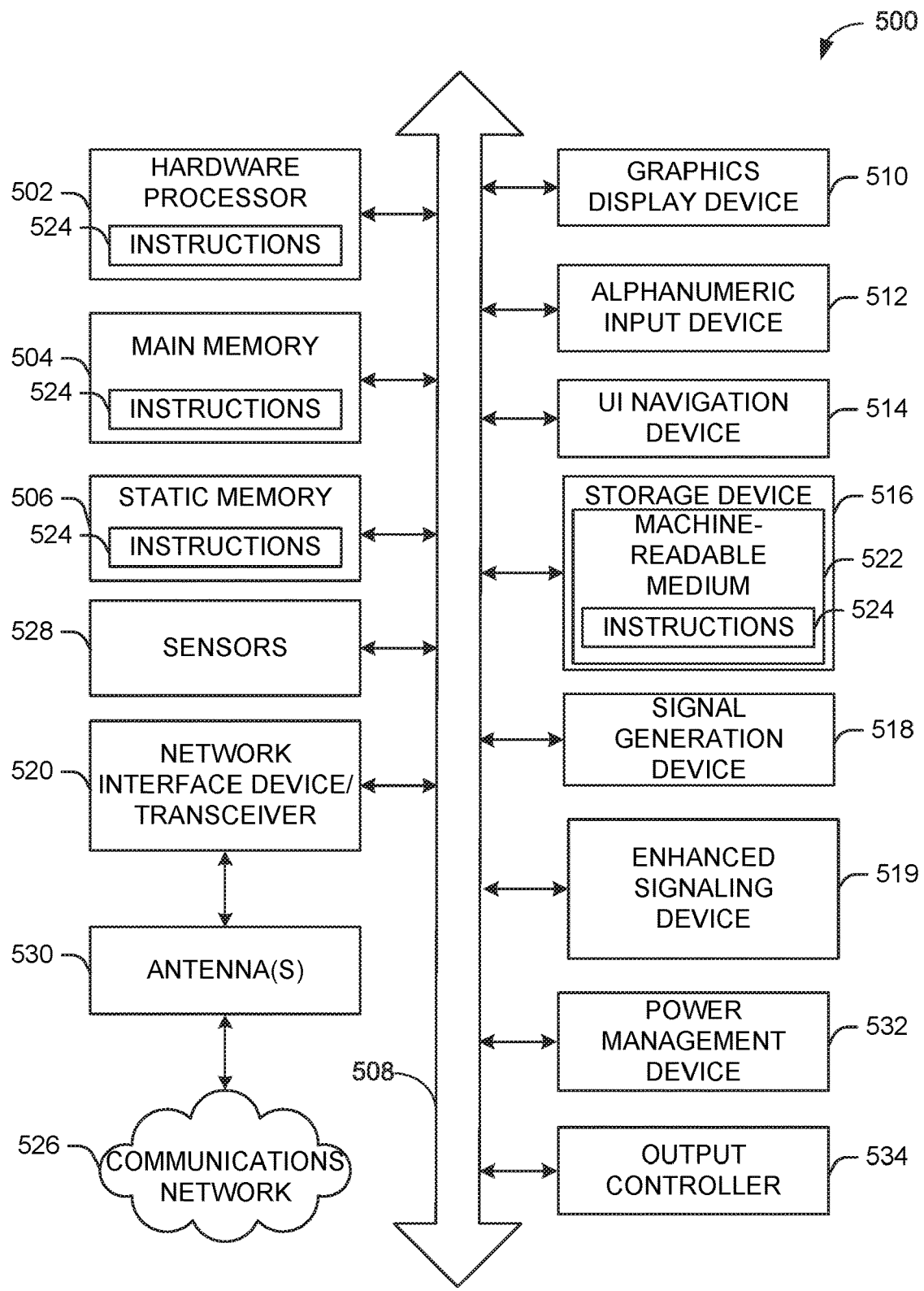
FIG. 5 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 4 and/or the example machine/system of FIG. 5.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile (e.g., a static) device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.1 lay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one or more embodiments, and with reference to FIG. 1, AP 102 may communicate with one or more user devices 120. The AP 102 and the one or more user devices 120 may exchange one or more frames 142. The one or more frames 142 may include management frames, MAC frames, PHY frames, NDPA frames, NPD frames, trigger frames, compressed beamforming and CQI frames (HE frames), beamforming report poll frames, compressed beamforming frames (VHT frames), and other frames.

In one or more embodiments, the one or more frames 142 may be MAC frames with an operating mode control field as shown below in Table 2.

TABLE 2

Control Information Subfield for Operating Mode Control Field:

| Field: | Rx NSS | Channel Width | UL MU Disable | Tx NSTS | Reserved |
|---|---|---|---|---|---|
| Bits | B0-B2 | B3-B4 | B5 | B6-B8 | B9-B11 |

A device dynamically may change its indication of receiving spatial stream support using the Rx NSS field shown in Table 2. A device dynamically may change its indication of transmitting spatial stream support using the Tx NSTS field as shown in Table 2. For example, when the one or more frames 142 are MAC frames, they may include three bits for a Rx NSS field 144 and three bits for a Tx NSTS field 146. To allow the Rx NSS field 144 and/or the Tx NSTS field 146 to support more than 8 spatial streams, each field may be extended using a reserved bit, such as one of bits 9-11 of the operating mode control field as shown, or other reserved bits of the frame (e.g., which may not be contiguous).

In one or more embodiments, the one or more frames 142 may be MAC frames with a HE link adaptation (HLA) control field as shown below in Table 3.

TABLE 3

Control Information Subfield for HLA Control Field:

| Field: | Unsolicited MFB | MRQ | NSS | HE-MCS | DCM | RU Allocation | BW | MSI/Partial PPDU Parameters | Tx BF | Reserved |
|---|---|---|---|---|---|---|---|---|---|---|
| Bits: | B0 | B1 | B2-B4 | B5-B8 | B9 | B10-B17 | B18-B19 | B20-B22 | B23 | B24-B25 |

A device may indicate a recommended number of spatial streams using the NSS field shown in Table 3.

In one or more embodiments, the one or more frames 142 may be operation mode notification frames as shown below in Table 4.

TABLE 4

Operating Mode Notification Element:

| Field: | Element ID | Length | Operating Mode |
|---|---|---|---|
| Octets: | 1 | 1 | 1 |

Table 5 below shows the subfields of the Operating Mode Field of Table 4.

TABLE 5

Operating Mode Field:

| Field: | Channel Width | 160/80 + 80 BW | No LDPC | Rx NSS | Rx NSS Type |
|---|---|---|---|---|---|
| Bits: | B0-B1 | B2 | B3 | B4-B6 | B7 |

A device dynamically may change its indication of support for receiving spatial streams using the Rx NSS field of Table 5.

In one or more embodiments, the one or more frames 142 may be trigger frames. Table 6 below shows a format of a user information field of a trigger frame.

TABLE 6

User Information Field:

| Field: | AID12 | RU Allocation | Coding Type | MCS | DCM | SS Allocation/ RA-RU Information (17/1849r2) | Target RSSI | Reserved | Trigger Dependent User Info |
|---|---|---|---|---|---|---|---|---|---|
| Bits: | B0-B11 | B12-B19 | B20 | B21-B24 | BB25 | B26-B31 | B32-B38 | B39 | Variable |

TABLE 7 below shows a format for the SS Allocation/RA-RU
Information field of Table 6.

| Field: | Starting Spatial Stream | Number Of Spatial Streams |
|---|---|---|
| Bits: | B26-B28 | B29-B31 |

Table 7: SS Allocation/RA-RU Information Subfield Format:

The starting spatial stream field of Table 7 may indicate the starting spatial stream for a solicited user device. The number of spatial streams subfield of Table 7 may indicate the number of spatial streams.

However, the Rx NSS field of Table 2, the Tx NSTS field of Table 2, the NSS field of Table 3, the Rx NSS field of Table 5, the starting spatial stream field of Table 7, and the number of spatial streams field of Table 7 each may use three bits (e.g., support for up to 8 spatial streams). To indicate support for more than 8 spatial streams, one or more bits may be needed to extend the above-mentioned fields, a new encoding of the three bits may be needed to indicate more than 8 spatial streams, or new fields may be defined.

In one or more embodiments, the number of bits used to indicate the number of spatial streams when the one or more frames 142 include a HLA control field shown in Table 3, the NSS field may be extended using a reserved bit.

In one or more embodiments, when the one or more frames 142 are operation mode notification frames, a number of bytes may be added to the Rx NSS field of Table 5. One bit in the extended operating mode field may be used to extend the Rx NSS field of Table 5. An additional bit may, in combination with the Rx NSS field of Table 5, jointly indicate support of the number provided in the Rx NSS field of Table 5.

In one or more embodiments, the one or more frames 142 may include trigger frames. To indicate a capability of recommending more than eight spatial streams, the AP 102 may add a bit to the starting spatial stream field shown in Table 7 and/or the number of spatial streams field shown in Table 7, may use a reserved bit of a trigger frame, may use another available bit of a trigger frame, or may define a new field with four or more bits to indicate the capability of using more than eight spatial streams for reception. For example, the one or more user devices 120 may indicate up to eight spatial streams with three bits in a currently defined trigger frame, and may need a fourth bit to indicate up to sixteen spatial streams. In one option, the encoding of the starting spatial stream field may be redefined. For example, when the value of the field is v, the indicated value may be x+y*v, where x may be a defined initial point, and y may be a scaling factor (e.g., x may be 2, and y may be 2). In another option, the encoding of the number of spatial streams field (not shown) may redefined. For example, when the value of the field is v, the indicated value may be x+y*v, where x may be a defined initial point, and y may be a scaling factor (e.g., x may be 2, and y may be 2). Non-linear encoding may be used in which 8 number from 1-16 may be represented by eight possible entries of the field. In another method, a bit may be added to extend the number of spatial streams field. The bit may be a reserved bit, a dual carrier modulation (DCM) bit, or a coding type bit, for example. When a DCM bit or coding type bit is used (e.g., bits from a DCM field or coding type field), the implication may be that the DCM is not used, that binary convolutional coding (BCC) is not used, low-density parity check coding (LDPC) is not used, or that the indication of a DCM field (e.g., as shown in Table 6), BCC field (not shown), or LDPC field (not shown) may be combined into a modulation and coding scheme (MCS) field (e.g., as shown in Table 6). An additional bit plus the bits for the number of spatial streams field may indicate the number of spatial streams. When the additional bit is set to 1, the indicated number of spatial streams may be eight plus the indicated value of the NSS field. When the additional bit is 0, the support of spatial streams may be the value of the NSS field.

It is understood that the above descriptions are for purposes of illustration and are not meant to be limiting.

Figure 2:
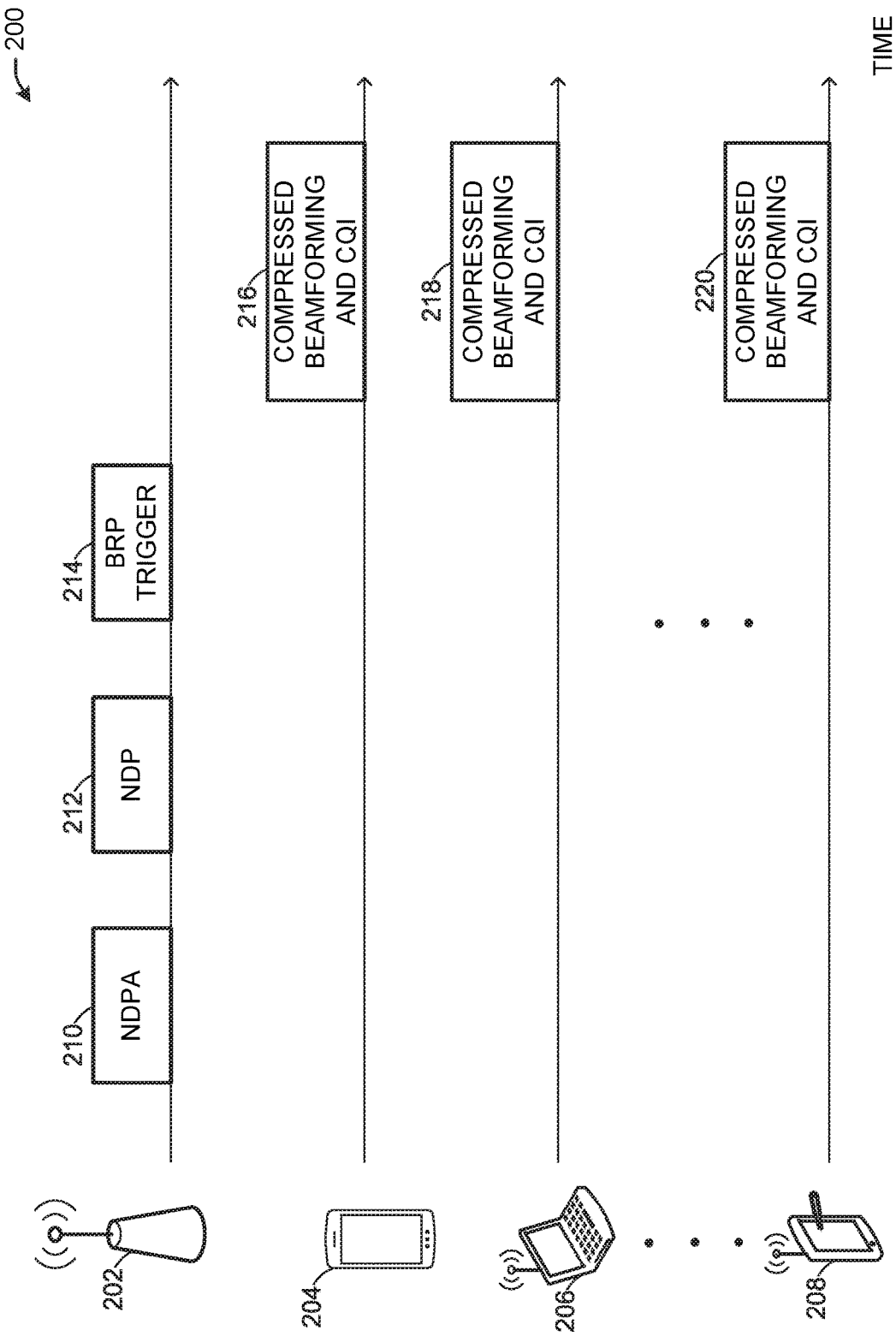
FIG. 2 depicts an illustrative multi-user sounding process, in accordance with one or more example embodiments of the present disclosure.

FIG. 2 depicts an illustrative multi-user sounding process 200, in accordance with one or more example embodiments of the present disclosure.

Referring to FIG. 2, the sounding process 200 may include an AP 202 communicating with multiple user devices, such as user device 204, user device 206, and user device 208. The AP 202 may send a NDPA frame 210 announcing that the AP 202 will then send a NDP frame 212. The AP 202 may send the NDP frame 212, allowing the user device 204, the user device 206, and the user device 208 to receive the NDP frame 212 and make beamforming and/or CQI calculations. The AP 202 may send a BRP trigger frame 214 to solicit compressed beamforming and CQI frames from the multiple user devices. The user device 204 may send a compressed beamforming and CQI frame 216. The user device 206 may send a compressed beamforming and CQI frame 218. The user device 208 may send a compressed beamforming and CQI frame 220. The format of the compressed beamforming and CQI frame 220 may be according to Table 1 above.

Table 8 below shows a portion of the HE MIMO control field of Table 1.

TABLE 8

| | | | | | | | | |
|---|---|---|---|---|---|---|---|---|
| HE MIMO Control Field: | | | | | | | | |
| Field: | Nc Index | Nr Index | BW | Grouping | Codebook Information | Feedback Type | Remaining Feedback Segments | First Feedback Segments |
| Bits: | B0-B2 | B3-B5 | B6-B7 | B8 | B9 | B10-B11 | B12-B14 | B15 |

Table 9 below shows an additional portion of the HE MIMO control field of Table 1.

TABLE 9

| | | | | |
|---|---|---|---|---|
| HE MIMO Control Field: | | | | |
| Field: | RU Start Index | RU End Index | Sounding Dialog Token Number | Reserved |
| Bits: | B16-B22 | B23-B29 | B30-B35 | B36-B39 |

The HE Compressed Beamforming Report field of Table 1 carries the average SNR of each space-time stream and compressed beamforming feedback matrices V for use by a transmit beamformer device to determine steering matrices Q. The Nc Index field indicates the number of spatial streams supported by the device. The frame may indicate a number of subcarriers for which a Compressed Beamforming Feedback Matrix subfield is sent back to the beamformer. A beamformer or beamformee, depending which of the two decides on the feedback parameters, reduces the number of subcarriers by using a method referred to as grouping, in which only a single compressed beamforming feedback matrix is reported for each group of adjacent subcarriers. The HE CQI-only Report field of Table 1 carries the per-RU (resource unit) average SNRs of each space-time stream, where each per-RU average SNR is the arithmetic mean of the SNR in decibels over a 26-tone RU for which the feedback is being requested.

The format of a trigger frame (e.g., the BRP trigger frame 214) is shown below in Table 10.

TABLE 10

| MAC Header Field: | MAC Header Frame Control | MAC Header Duration | MAC Header RA | MAC Header TA | Common Info | User Info | — | User Info | Padding | FCS |
|---|---|---|---|---|---|---|---|---|---|---|
| Trigger Frame: | | | | | | | | | | |
| Octets: | 2 | 2 | 6 | 6 | 8+ | 5+ | | 5+ | Variable | 4 |

The subfields of the common information field of Table 10 are shown below in Table 11.

TABLE 11

Common Information Field:

| Field: | Trigger Type | Length | More TF (#11003) | CS Required | BW | GI And LTF Type | MU-MIMO LTF Mode | Number Of HE-LTF Symbols And Midamble Periodically |
|---|---|---|---|---|---|---|---|---|
| Bits: | B0-B3 | B4-B15 | B16 | B17 | B18-B19 | B20-B21 | B22 | B23-B25 |

| Field: | SSTBC | LDPC Extra Symbol Segments | AP TX Power | Packet Extension | Spatial Reuse | Doppler | HE-SIG-A Reserved | Reserved |
|---|---|---|---|---|---|---|---|---|
| Bits: | B26 | B27 | B28-B33 | B34-B36 | B37-B52 | B53 | B54-B62 | 1 |

| Field: | Trigger Dependent Common Info |
|---|---|
| Bits: | Variable |

For next generation IEEE 802.11 design, one enhancement may be to expand the maximum bandwidth from 160 MHz to 320 MHz and expand the maximum spatial streams from 8 to 16. The expansion may require more time to report the compressed beamforming information and CQI frames. The current 802.11 maximum beamforming report size is 91,632 bytes based on the following calculation. The maximum IEEE 802.11 MPDU size is 11,454 bytes and the maximum number of reporting segments allowed for providing feedback is 8. As a result, the maximum size of feedback is 8*11454=91,632 bytes. This is not enough to support 16×16, 320 MHz beamforming 133,016 bytes needed based on the following equation. Assume that Nc is 16. Assume that Na is around 200 for 16×16 matrices. For each 80 MHz, there may be 1000 subcarriers. Assume Ng=4. For 320 MHz, Ns=1000. For a HE Compressed Beamforming Report field, assume that the report follows the same design. 8*16=128 bits may be needed to indicate an average SNR of each stream. 5*200*1000=1,000,000 bits may be needed for a compressed beamforming feedback matrix V. For a HE MU exclusive beamforming report field, assume that the report follows the same design. 16*1000*4=64,000 bits may be needed for a delta SNR report. For a feedback type of MU, the number of required feedback may be at least 1,064,128 bits or 133,016 bytes. Such requires more than 8 segments to carry the feedback.

In one or more embodiments, the segmentation of IEEE 802.11 beamforming reporting may be increased (e.g., the number of segments used to provide the beamforming reporting may be increased) to allow for more than eight segmented reports. For example, sixteen or more reports may be allowed. A compressed beamforming and CQI report may be transmitted in a single frame unless the size of the feedback exceeds a size threshold (e.g., 11,454 octets), in which case the feedback may be segmented. When the compressed beamforming and CQI report is split into multiple segments (e.g., multiple frame transmissions), each feedback segment may be included in a separate frame and may include successive portions of the report, followed by any MU exclusive beamforming report information. Each segment may be the same length except for the final segment, which may be shorter in length (e.g., based on a MAC protocol data unit length).

In one or more embodiments, to increase the number of segments of beamforming reporting beyond eight segments, a new trigger frame may be defined to allow for a number of bits in a feedback segment retransmission bitmap. In one option, an entry in a trigger type field of a common information field of the BRP trigger frame 214 may be used. A trigger-dependent user information field may include at least X bits of a feedback segment retransmission bitmap, wherein X>8. The feedback segment retransmission bitmap subfield may indicate the requested feedback segments of a compressed beamforming report. When the bit in position n (e.g., n=0 for least significant bits and n=X−1 for most significant bits) is one, the feedback segment with the remaining feedback segments equal to n is requested. When the bit in position n is zero, the feedback segment with the remaining feedback segments equal to n is not requested. In another option, the BRP trigger frame signaling may be extended. The trigger-dependent user subfield may include at least X bits of a feedback segment retransmission bitmap, where X>8. The signaling of the new format of the feedback segment retransmission bitmap may indicate to the user device 204, the user device 206, and the user device 208 to interpret the trigger-dependent user information field as the new format, and the signaling for the new interpretation may be included in an element of a management frame. The new BRP trigger frame 214 may only include a user information field for next generation STAs that have the capability of recognizing the new format (e.g., the new format may not be used for legacy devices or may indicate to legacy devices that they should ignore the information in the frame).

In one or more embodiments, another option to increase the number of segments of beamforming reporting beyond eight segments may include redefining the feedback segment retransmission bitmap of the BRP trigger frame 214. The feedback segment retransmission bitmap subfield may indicate the requested feedback segments of a compressed beamforming report. When the bit in position n (e.g., n=0 for least significant bits and n=X−1 for most significant bits) is one, then the feedback segment with the remaining feedback segments equal to 2*n and 2*n+1, if it exists, is requested. When the bit in position n is zero, then the feedback segment with the remaining feedback segments equal to 2*n and 2*n+1 is not requested. The signaling of the new format of the feedback segment retransmission bitmap may indicate to the user device 204, the user device 206, and the user device 208 to interpret the trigger-dependent user information field as the new format, and the signaling for the new interpretation may be included in an element of a management frame. The new BRP trigger frame 214 may only include a user information field for next generation STAs that have the capability of recognizing the new format (e.g., the new format may not be used for legacy devices or may indicate to legacy devices that they should ignore the information in the frame). The signaling may use the following bits from a user information field: a reserved bit, a spatial stream (SS) allocation field (e.g., implying that only a fixed number of spatial streams may be used to transmit feedback in response to a BRP trigger frame), a DCM field (e.g., implying that DCM is not used or that DCM is merged into a MCS field with different encoding), or a coding type field (e.g., implying that BCC and/or LDPC is not used, or that a coding type indication is merged with the MCS field with different encoding).

In one or more embodiments, another option to increase the number of segments of beamforming reporting beyond eight segments may include reusing trigger frame subfields in a user information field to solicit feedback segments when there are more than eight segments using any combination of the following bits for the feedback segment retransmission bitmap included in the BRP trigger frame 214: a reserved bit, a SS allocation field (e.g., implying that only a fixed number of spatial streams may be used to transmit feedback in response to a BRP trigger frame), a DCM field (e.g., implying that DCM is not used or that DCM is merged into a MCS field with different encoding), or a coding type field (e.g., implying that BCC and/or LDPC is not used, or that a coding type indication is merged with the MCS field with different encoding). The additional bit and the existing eight bits in the trigger-dependent user information field jointly may indicate the feedback segment retransmission bitmap having X bits.

The format of the NDPA frame 210 is shown below in Table 12.

TABLE 12

| | | HE NDPA Frame Format: | | | | | | |
|---|---|---|---|---|---|---|---|---|
| Field: | MAC Header Frame Control | MAC Header Duration | MAC Header RA | MAC Header TA | Sounding Dialog Token | STA Info 1 | STA Info n | FCS |
| Octets: | 2 | 2 | 6 | 6 | 1 | 4 | 4 | 4 |

Table 13 below shows the format of the sounding dialog token field of Table 12.

TABLE 13

| | Sounding Dialog Token Field: | | |
|---|---|---|---|
| Field: | Reserved | HE | Sounding Dialog Token Number |
| Bits: | B0 (No longer includes B1) | B1 (New) | B2-B7 |

In one or more embodiments, the sounding dialog token field of Table 12 may be used to differentiate between a HE NDPA or VHT NDPA frame (e.g., to indicate whether the NDPA frame 210 is a VHT NDPA frame or a HE NDPA frame).

Table 14 below shows the format of the STA information field of Table 12.

TABLE 14

| | STA Information Subfield of a NDPA frame: | | | | | |
|---|---|---|---|---|---|---|
| Field: | AID11 | Partial BW Info | Feedback Types and Ng | Disambiguation | Codebook Size | Nc |
| Bits: | B0-B10 | B11-B24 | B25-B26 | B27 | B28 | B29-B31 |

The partial bandwidth (BW) information field of Table 14 may indicate the bandwidth used to send feedback. Table 15 below shows the format of the partial BW information subfield of Table 14.

TABLE 15

| Partial BW Information Subfield: | | |
|---|---|---|
| Field: | RU Start | RU End Index |
| Bits: | B0-B6 | B7-B13 |

In one or more embodiments, the disambiguation field of Table 14 may use a disambiguation bit may be used to indicate to a VHT device that the STA information field of Table 12 is not intended for the VHT device.

The encoding of the feedback type and Ng field of Table 14 is shown below in Table 16.

TABLE 16

Feedback Type and Ng Encoding:

| Feedback Type And Ng | | Codebook Size | Description |
| --- | --- | --- | --- |
| B25 | B26 | B28 | |
| 0 | 0 | 0 | SU, Ng = 4, quantization resolution $(\varphi, \psi) = \{4, 2\}$ |
| 0 | 0 | 1 | SU, Ng = 4, quantization resolution $(\varphi, \psi) = \{6, 4\}$ |
| 0 | 1 | 0 | SU, Ng = 16, quantization resolution $(\varphi, \psi) = \{4, 2\}$ |
| 0 | 1 | 1 | SU, Ng = 16, quantization resolution $(\varphi, \psi) = \{6, 4\}$ |
| 1 | 0 | 0 | MU, Ng = 4, quantization resolution $(\varphi, \psi) = \{7, 5\}$ |
| 1 | 0 | 1 | MU, Ng = 4, quantization resolution $(\varphi, \psi) = \{9, 7\}$ |
| 1 | 1 | 0 | CQI only feedback |
| 1 | 1 | 1 | MU, Ng = 16, quantization resolution $(\varphi, \psi) = \{9, 7\}$ |

In the IEEE 802.11az technical standard, the format of the NDPA frame 210 is reused, and bits 0 and 1 of the sounding dialog token field of Table 12 are set to 1 and 0, respectively, to indicate an IEEE 802.11az NDPA frame.

In one or more embodiments, to extend the sounding protocol signaling in order to support up to 16 spatial streams and wide bandwidth (320 MHz) operation modes, the NDPA frame 210 may be expanded with one of multiple options, or the sounding feedback may be expanded using one of multiple options. In each option to expand the NDPA frame 210, bits 0 and 1 of the sounding dialog token field of Table 12 may be set to 1 and 1.

In one or more embodiments, one option to expand the NDPA frame 210 may include allocating six bytes to the STA information field of Table 12. Bits 27 and 43 of the NDPA frame 210 may be the disambiguation bits (e.g., set to 1 to indicate to VHT devices that the STA information field is not intended for VHT devices). To indicate to HE devices that the STA information field is not for HE devices, bits 5, 6, 37, and 38, or other bits of the NDPA frame 210 may be used as the disambiguation bits (e.g., set to 1). Bits 4, 6, 36, and 38 of the NDPA frame 210 may be used as disambiguation fields, corresponding to bits 20 and 22 of the RU start index field of Table 15, because the corresponding RU start index may be larger than 80, and HE devices may not support that size. 11 bits may be used for the AID11 field of Table 14 with the same definition as an HE NDPA frame. The AID11 field may use non-contiguous bits. Three or four bits may be used for the Nc field, and the bits may be non-contiguous. Two bits may be used for the feedback type and Ng field, and the indication may include SU feedback, MU feedback, and CQI feedback. The feedback type and Ng field size may be extended to indicate a different Ng value, and the field may use non-contiguous bits. One bit may be used for the codebook size field, which may be extended to indicate different quantization error, and the field may use non-contiguous bits. An additional grouping field may be added to indicate Ng grouping of Ng=4 or Ng=16 (e.g., Ng being the number of groups), and an additional feedback type field may be introduced to indicate SU feedback, MU feedback, and CQI feedback. The additional feedback type field may use non-contiguous bits. 16 bits may be used for the partial BW information field: 8 bits may be used for the RU start index subfield to indicate the first 26-tone RU requested for feedback, and 8 bits may be used for the RU end index subfield to indicate the last 26-tone RU requested for feedback. The partial BW information field may use non-contiguous bits. The BW field may indicate the channel width used to determine starting and ending subcarrier indices when interpreting the RU start index and RU end index subfield. Entries of the BW field may indicate 320 MHz, 160+160 MHz, 20 MHz, 40 MHz, 80 MHz, 160 MHz, or 80+80 MHz.

In one or more embodiments, another option to expand the NDPA frame 210 may include redefining the STA information field of Table 12. The RU start index subfield may indicate the first 52-tone RU for requested feedback. The RU end index subfield may indicate the last 52-tone RU for requested feedback. Bit 26 of the feedback type and Ng field may be used to extend the Nc field (e.g., implying that there is no Ng=4 for requesting SU or MU feedback). When bit 26 is set to 1, the Nc value is 8 plus the value of the Nc field. When bit 26 is 0, the Nc value is the value in the Nc field.

In one or more embodiments, to modify sounding feedback, the Nc field, the Nr field, and/or the BW field of Table 8 may be extended using reserved bits. The extension of Nc and Nr may allow for more than 8 spatial streams and antennas. The extension of the BW field may allow for more than 160 MHz. The RU start index subfield of Table 15 may be redefined to indicate the starting RU index of the first 52-tone RU for which feedback is requested. The RU end index subfield of Table 15 may be redefined to indicate the last RU index of the first 52-tone RU for which feedback is requested. A reserved bit may be used to extend the remaining feedback segments field of Table 8. When the bit is set, the remaining feedback segment is 8 plus the value of the remaining feedback segment field. A reserved bit may be used to extend the grouping field of Table 8. When the bit is set, the grouping field may indicate two additional Ng groupings.

In one or more embodiments, to modify sounding feedback, another option may be to design a new compressed beamforming and CQI action frame (e.g., to replace the compressed beamforming and CQI frame 216) to enable signaling for more than 8 antennas and to enable operations in more than 160 MHz. The frame may reuse a HE action frame format or may be new. An entry in an action field may indicate whether the frame is a next generation compressed beamforming and CQI frame. The format for the new frame may be according to Table 1 as shown above. The next generation MIMO control of Table 1 may include a Nc field, Nr field, BW field, grouping field, codebook information field, feedback type field, remaining feedback segments field, first feedback segment field, RU start index field, RU end index field, and a sounding dialog token number field. The Nc field may include at least 3 or 4 bits. The Nr field may include at least 4 bits. The BW field may include at least 3 bits. The grouping field may include at least one bit. The codebook information field may include at least one bit. The feedback type field may include at least two bits. The remaining feedback segments field may include at least 4 bits. The first feedback segment field may include one bit. The RU start index field may include at least 7 bits. The RU end index field may include at least 7 bits. The sounding dialog token number field may include at least 6 bits.

Figure 3:
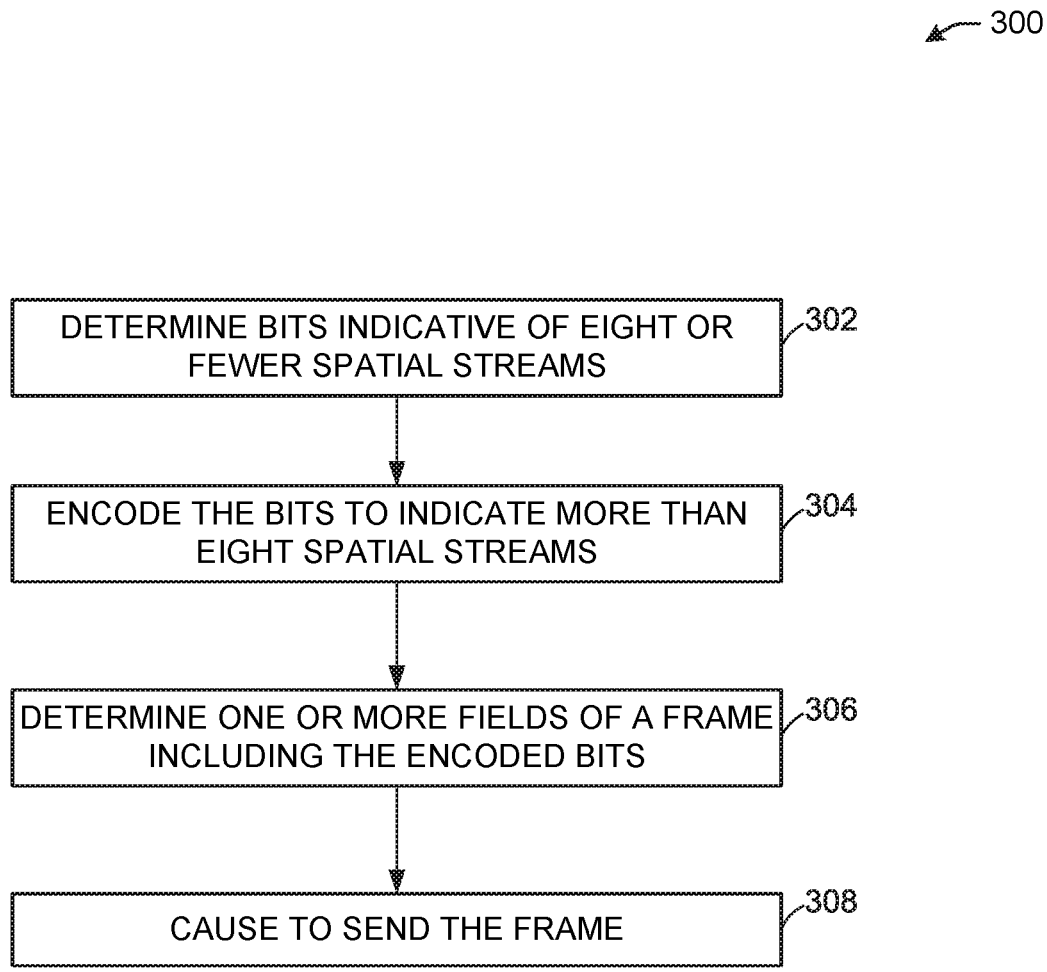
FIG. 3 illustrates a flow diagram of illustrative process for enhanced signaling and use of multiple transmission chains, in accordance with one or more example embodiments of the present disclosure.

FIG. 3 illustrates a flow diagram of illustrative process 300 for enhanced signaling and use of multiple transmission chains, in accordance with one or more example embodiments of the present disclosure.

At block 302, processing circuitry of a device (e.g., the AP of FIG. 1 or the one or more user devices 120 of FIG. 1) may determine bits indicative of eight or fewer spatial streams.

For example, the bits may be three bits of the Rx NSS field or the Tx NSTS of Table 2, three bits of the NSS field of Table 3, three bits of the Rx NSS field of Table 5, three bits of the starting spatial stream field or the number of spatial streams field of Table 7, three bits of the Nc index field, the Nr index field, or the remaining feedback segments field of Table 8, seven bits of the RU start index field or the RU end index field of Table 9, or bits of a feedback segment retransmission bitmap of a trigger frame. The bits may indicate capabilities of using up to 8 spatial streams or antennas, and/or up to 160 MHz bandwidth.

At block 304, the processing circuitry may encode the bits to indicate more than 8 spatial streams or antennas, and/or a capability of operating in more than 160 MHz. For example, one or more reserved bits or other available bits in a respective type of frame may be used to extend one of the fields of the bits which indicate a capability of up to 8 spatial streams or antennas, or an operation capability of up to 160 MHz. When the bits include three bits, a fourth bit may be added, and may be non-contiguous (e.g., the extended bit may be from a non-contiguous field such as a reserved field or another field of the same frame). Alternatively, the encoding of the bits to expand capabilities beyond 8 spatial streams or antennas, and/or to extend capabilities to using more than 160 MHz, may include using a scalar factor (e.g., instead of using three bits to indicate values 1-8, a scalar factor may allow the same three bits to indicate values of 2-16 in increments of two). Alternatively, the bits from a field of a frame may be encoded to form a different frame format than previously available IEEE 802.11 frame formats.

At block 306, the processing circuitry may determine one or more fields of a frame (e.g., an extremely high throughput—EHT—frame) including the encoded bits. The frame may reuse all or a portion of previous frame formats, such as VHT or HE frame formats, in the definition of a new EHT frame format. For example, the bits may be bits of the Rx NSS field or the Tx NSTS of Table 2, bits of the NSS field of Table 3, bits of the Rx NSS field of Table 5, bits of the starting spatial stream field or the number of spatial streams field of Table 7, bits of the Nc index field, the Nr index field, or the remaining feedback segments field of Table 8, bits of the RU start index field or the RU end index field of Table 9, or bits of a feedback segment retransmission bitmap of a trigger frame. The encoded bits may indicate capabilities of using more than 8 spatial streams or antennas, and/or more than 160 MHz bandwidth. The frame may include management frames, MAC frames, PHY frames, NDPA frames, NPD frames, trigger frames, compressed beamforming and CQI frames (HE frames), beamforming report poll frames, compressed beamforming frames (VHT frames), and other frames. The frame may include one or more indications that the frame is intended for an EHT device (e.g. an EHT capability) and that at least a portion of the frame may be ignored by a legacy device (e.g., a VHT or HE device). For example, the disambiguation field of Table 14 may use a disambiguation bit may be used to indicate to a VHT device that the STA information field of Table 12 is not intended for the VHT device. To indicate to HE devices that a STA information field of the frame is not for HE devices, bits 5, 6, 37, and 38, or other bits of a NDPA frame may be used as the disambiguation bits (e.g., set to 1). Bits 4, 6, 36, and 38 of a NDPA frame may be used as disambiguation fields, corresponding to bits 20 and 22 of the RU start index field of Table 15, because the corresponding RU start index may be larger than 80, and HE devices may not support that size.

At block 308, the processing circuitry may cause the device to send the frame. The frame may be sent to one or more user devices or APs, depending on the type of frame.

It is understood that the above descriptions are for purposes of illustration and are not meant to be limiting.

FIG. 4 shows a functional diagram of an exemplary communication station 400 in accordance with some embodiments. In one embodiment, FIG. 4 illustrates a functional block diagram of a communication station that may be suitable for use as an AP 102 (FIG. 1) or user device 120 (FIG. 1) in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or media access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in FIGS. 1-3.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 400 may include one or more processors and may be configured with instructions stored on a computer-readable storage device memory.

FIG. 5 illustrates a block diagram of an example of a machine 500 or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a speaker), an enhanced signaling device 519, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 502 for generation and processing of the baseband signals and for controlling operations of the main memory 504, the storage device 516, and/or the enhanced signaling device 519. The baseband processor may be provided on a single radio card, a single chip, or an integrated circuit (IC).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

The enhanced signaling device 519 may carry out or perform any of the operations and processes (e.g., process 300 of FIG. 3) described and shown above.

In one or more embodiments, to allow for and signal the capability of more than eight spatial streams or antennas, or to increase the number of beamforming report segments that a device may send, the enhanced signaling device 519 may use bits currently reserved in defined Wi-Fi frame formats, may use other bits allocated to other information in defined Wi-Fi frame formats, may add bits to an existing Wi-Fi frame format, or may define a new field of a Wi-Fi frame in a new format.

In one or more embodiments, to indicate a capability of receiving more than eight spatial streams, the enhanced signaling device 519 may add a bit to the Rx NSS (receive number of spatial streams) field of a MAC frame (e.g., in an operating mode control subfield), may use a reserved bit of a MAC frame, may use another available bit of a MAC frame, or may define a new field with four or more bits to indicate the capability of using more than eight spatial streams for reception. For example, the enhanced signaling device 519 may indicate up to eight receive spatial streams with three bits in currently defined MAC frames, and may need a fourth bit to indicate up to sixteen spatial streams. When a reserved bit of a MAC frame is available, the three bits of the Rx NSS field and the reserved bit may combine for four bits to indicate support of up to 16 spatial streams. When the reserved bit is set to 1, the indicated support of receive spatial streams may be eight plus the indicated value of the Rx NSS field. When the reserved bit is 0, the support of receive spatial streams may be the value of the Rx NSS field.

In one or more embodiments, to indicate a capability of transmitting more than eight spatial streams, the enhanced signaling device 519 may add a bit to the Tx NSTS (transmit number of spatial streams) field of a MAC frame (e.g., in an operating mode control subfield), may use a reserved bit of a MAC frame, may use another available bit of a MAC frame, or may define a new field with four or more bits to indicate the capability of using more than eight spatial streams for transmission. For example, the enhanced signaling device 519 may indicate up to eight transmit spatial streams with three bits in currently defined MAC frames, and may need a fourth bit to indicate up to sixteen spatial streams. When a reserved bit of a MAC frame is available, the three bits of the Tx NSTS field and the reserved bit may combine for four bits to indicate support of up to 16 spatial streams. When the reserved bit is set to 1, the indicated support of transmit spatial streams may be eight plus the indicated value of the Tx NSTS field. When the reserved bit is 0, the support of transmit spatial streams may be the value of the Tx NSTS field.

In one or more embodiments, to indicate a capability of recommending more than eight spatial streams, the enhanced signaling device 519 may add a bit to the NSS (number of spatial streams) field of a MAC frame (e.g., in a HLA control subfield), may use a reserved bit of a MAC frame, may use another available bit of a MAC frame, or may define a new field with four or more bits to indicate the capability of using more than eight spatial streams for reception. For example, a STA may indicate up to eight spatial streams with three bits in currently defined MAC frames, and may need a fourth bit to indicate up to sixteen spatial streams. When a reserved bit of a MAC frame is available, the three bits of the NSS field and the reserved bit may combine for four bits to indicate support of up to 16 spatial streams. When the reserved bit is set to 1, the indicated support of spatial streams may be eight plus the indicated value of the NSS field. When the reserved bit is 0, the support of spatial streams may be the value of the NSS field.

In one or more embodiments, to indicate a capability of recommending more than eight spatial streams, the enhanced signaling device 519 may add a bit to the Rx NSS subfield of an operating mode field of an operation mode notification frame, may use a reserved bit of an operation mode notification frame, may use another available bit of an operation mode notification frame, or may define a new field with four or more bits to indicate the capability of using more than eight spatial streams for reception. For example, the enhanced signaling device 519 may indicate up to eight spatial streams with three bits in a currently defined operation mode notification frame, and may need a fourth bit to indicate up to sixteen spatial streams. When a reserved bit of an operation mode notification frame is available, the three bits of the Rx NSS field and the reserved bit may combine for four bits to indicate support of up to 16 spatial streams. When the reserved bit is set to 1, the indicated support of receive spatial streams may be eight plus the indicated value of the Rx NSS field. When the reserved bit is 0, the support of receive spatial streams may be the value of the Rx NSS field.

In one or more embodiments, to indicate a capability of recommending more than eight spatial streams, the enhanced signaling device 519 may add a bit to the starting spatial stream field and/or the number of spatial streams field of a user information field of a trigger frame, may use a reserved bit of a trigger frame, may use another available bit of a trigger frame, or may define a new field with four or more bits to indicate the capability of using more than eight spatial streams for reception. For example, the enhanced signaling device 519 may indicate up to eight spatial streams with three bits in a currently defined trigger frame, and may need a fourth bit to indicate up to sixteen spatial streams. In one option, the encoding of the starting spatial stream field may be redefined. For example, when the value of the field is v, the indicated value may be x+y*v, where x may be a defined initial point, and y may be a scaling factor (e.g., x may be 2, and y may be 2). In another option, the encoding of the number of spatial streams field may redefined. For example, when the value of the field is v, the indicated value may be x+y*v, where x may be a defined initial point, and y may be a scaling factor (e.g., x may be 2, and y may be 2). Non-linear encoding may be used in which 8 number from 1-16 may be represented by eight possible entries of the field. In another method, a bit may be added to extend the number of spatial streams field. The bit may be a reserved bit, a DCM bit, or a coding type bit, for example. When a DCM bit or coding type bit is used (e.g., bits from a DCM field or coding type field), the implication may be that the DCM is not used, that BCC is not used, LDPC is not used, or that the indication of a DCM field, BCC field, or LDPC field may be combined into a MCS field. An additional bit plus the bits for the number of spatial streams field may indicate the number of spatial streams. When the additional bit is set to 1, the indicated number of spatial streams may be eight plus the indicated value of the NSS field. When the additional bit is 0, the support of spatial streams may be the value of the NSS field.

In one or more embodiments, the enhanced signaling device 519 may increase the segmentation of IEEE 802.11 beamforming reporting (e.g., the number of segments used to provide the beamforming reporting may be increased) to allow for more than eight segmented reports. For example, sixteen or more reports may be allowed. A compressed beamforming and CQI report may be transmitted in a single frame unless the size of the feedback exceeds a size threshold (e.g., 11,454 octets), in which case the feedback may be segmented. When the compressed beamforming and CQI report is split into multiple segments (e.g., multiple transmissions), each feedback segment may be included in a separate frame and may include successive portions of the report, followed by any MU exclusive beamforming report information. Each segment may be the same length except for the final segment, which may be shorter in length (e.g., based on a MAC protocol data unit length).

In one or more embodiments, to increase the number of segments of beamforming reporting beyond eight segments, the enhanced signaling device 519 may use a new trigger frame to allow for a number of bits in a feedback segment retransmission bitmap. In one option, an entry in a trigger type field of a common information field of a trigger frame may be used. A trigger-dependent user information field may include at least X bits of a feedback segment retransmission bitmap, wherein X>8. The feedback segment retransmission bitmap subfield may indicate the requested feedback segments of a compressed beamforming report. When the bit in position n (e.g., n=0 for least significant bits and n=X−1 for most significant bits) is one, the feedback segment with the remaining feedback segments equal to n is requested. When the bit in position n is zero, the feedback segment with the remaining feedback segments equal to n is not requested. In another option, the BRP trigger frame signaling may be extended. The trigger-dependent user subfield may include at least X bits of a feedback segment retransmission bitmap, where X>8. The signaling of the new format of the feedback segment retransmission bitmap may indicate to STAs to interpret the trigger-dependent user information field as the new format, and the signaling for the new interpretation may be included in an element of a management frame. The new BRP trigger frame may only include a user information field for next generation STAs that have the capability of recognizing the new format (e.g., the new format may not be used for legacy devices or may indicate to legacy devices that they should ignore the information in the frame).

In one or more embodiments, another option to increase the number of segments of beamforming reporting beyond eight segments may include the enhanced signaling device 519 redefining the feedback segment retransmission bitmap of a BRP trigger frame. The feedback segment retransmission bitmap subfield may indicate the requested feedback segments of a compressed beamforming report. When the bit in position n (e.g., n=0 for least significant bits and n=X−1 for most significant bits) is one, then the feedback segment with the remaining feedback segments equal to 2*n and 2*n₊1, if it exists, is requested. When the bit in position n is zero, then the feedback segment with the remaining feedback segments equal to 2*n and 2*n+1 is not requested. The signaling of the new format of the feedback segment retransmission bitmap may indicate to STAs to interpret the trigger-dependent user information field as the new format, and the signaling for the new interpretation may be included in an element of a management frame. The new BRP trigger frame may only include a user information field for next generation STAs that have the capability of recognizing the new format (e.g., the new format may not be used for legacy devices or may indicate to legacy devices that they should ignore the information in the frame). The signaling may use the following bits from a user information field: a reserved bit, a spatial stream (SS) allocation field (e.g., implying that only a fixed number of spatial streams may be used to transmit feedback in response to a BRP trigger frame), a DCM field (e.g., implying that DCM is not used or that DCM is merged into a MCS field with different encoding), or a coding type field (e.g., implying that BCC and/or LDPC is not used, or that a coding type indication is merged with the MCS field with different encoding).

In one or more embodiments, another option to increase the number of segments of beamforming reporting beyond eight segments may include the enhanced signaling device 519 reusing trigger frame subfields in a user information field to solicit feedback segments when there are more than eight segments using any combination of the following bits for the feedback segment retransmission bitmap: a reserved bit, a SS allocation field (e.g., implying that only a fixed number of spatial streams may be used to transmit feedback in response to a BRP trigger frame), a DCM field (e.g., implying that DCM is not used or that DCM is merged into a MCS field with different encoding), or a coding type field (e.g., implying that BCC and/or LDPC is not used, or that a coding type indication is merged with the MCS field with different encoding). The additional bit and the existing eight bits in the trigger-dependent user information field jointly may indicate the feedback segment retransmission bitmap having X bits.

In one or more embodiments, to support more than 8 spatial streams and a bandwidth of more than 160 MHz, the enhanced signaling device 519 may expand NDPA frames. In multiple options, the currently defined NDPA frame may be reused with bits 0 and 1 of a sounding dialog token field being set to 1. In one of the options, the STA information field may include six bytes, with bits 27 and 43 used as disambiguation bits set to 1 to indicate to VHT STAs not to consider a next generation STA information field as its VHT STA information field. Bits 5, 6, 37, and 38 may be disambiguation bits for HE STAs and set to 1 to indicate to a HE STA not to consider a next generation STA information field as its HE STA information field. The resource unit start index may be larger than 96, which is larger than what a HE STA currently may support. The disambiguation bits may be bits 4, 6, 36, and 38 (e.g., corresponding to bits 20 and 22 of the resource unit start index field) because the resource unit start index field may be larger than 80, which is the limit that the HE STAs currently may support. Eleven bits may be used for an access identifier (AID) 11 field (e.g., the 11$^{th}$ AID field), and the bits may be used with the same definition as a HE NDPA frame (e.g., the bits may not be contiguous).

In one or more embodiments, still referring to the first option for the NDPA frame expansion, the enhanced signaling device 519 may use three or four bits for the Nc field. Two bits may be used for the feedback type and Ng (number of groupings) field with a same definition of a HE NDPA frame (e.g., indicating SU feedback, MU feedback, and CQI feedback). The feedback type and Ng field size may be extended and may use non-contiguous bits. One bit may be used for the codebook size field with a same definition of a HE NDPA frame. The codebook size field may be extended to indicate a different quantization error, and the bits may be non-contiguous. An additional grouping field may be used to indicating Ng grouping. The indication may include Ng=4 or Ng=16.

In one or more embodiments, still referring to the first option for the NDPA frame expansion, an additional grouping field may be used by the enhanced signaling device 519 to indicate Ng field grouping. An indication may include Ng=4 or Ng=16. An additional feedback type field may be added to the frame to include an indication of SU feedback, MU feedback, or CQI feedback requested, and the field may use non-contiguous bits. The bandwidth information field of the frame may include 16 bits, 8 of which may be used for the resource unit start index subfield to indicate the first 26-tone resource unit for which an HE beamformer device is requesting feedback, and 8 of which may be used for the resource unit end index subfield to indicate the last 26-tone resource unit for which the HE beamformer device is requesting feedback. The bits of the bandwidth information field used for the indications may be non-contiguous.

In one or more embodiments, still referring to the first option for the NDPA frame expansion, a bandwidth field may be used by the enhanced signaling device 519 to indicate a channel width used to determine the starting and ending subcarrier indices when interpreting the resource unit start index subfield and the resource unit end index subfield. One entry may indicate a 320 MHz bandwidth or a 160+160 MHz (e.g., non-contiguous) bandwidth. One entry may indicate a 20 MHz bandwidth. One entry may indicate a 40 MHz bandwidth. One entry may indicate a 80 MHz bandwidth. One entry may indicate a 160 MHz or an 80+800 MHz (e.g., non-contiguous) bandwidth. A single bit may be used to indicate whether the bandwidth is 320 MHz or 160+160 MHz, and may allow for the signaling in a bandwidth signaling transmitter address field. The remaining bits of the NDPA frame may be reserved.

In one or more embodiments, a second option for NDPA frame expansion may include the enhanced signaling device 519 redefining fields in a STA information field. For example, the resource unit start index subfield of the partial bandwidth subfield may indicate a first 52-tone resource unit for which an HE beamformer device may request feedback. The resource unit end index subfield may indicate a last 52-tone resource unit for which the HE beamformer device is requesting feedback. A bit, such as bit 26 of the feedback type and Ng field, may be used to extend the Nc field of the frame, which implies that there may be no Ng=4 when requesting SU or MU feedback. When the bit is set to 1, the indicated Nc field value may be equal to 8 plus the value of the Nc field. When the bit is set to 0, the indicated Nc field value may be the value of the Nc field.

In one or more embodiments, the sounding feedback from STAs may be modified by the enhanced signaling device 519 based on multiple options. In one option, a STA may use reserved bits in the HE MIMO control filed to extend existing fields. For example, one reserved bit may extend the Nc field. When the bit is set to 1, the indicated Nc field value may be equal to 8 plus the value of the Nc field. When the bit is set to 0, the indicated Nc field value may be the value of the Nc field. One reserved bit may be used to extend the Nr field. When the bit is set to 1, the indicated Nr field value may be equal to 8 plus the value of the Nr field. When the bit is set to 0, the indicated Nr field value may be the value of the Nr field. A reserved bit may be used to extend the bandwidth field. The bit may be used to indicate a 320 MHz or a 160+160 MHz bandwidth. When the bit is set, the bandwidth field may be used for other purposes. When the bit is set, one of two bits may be used to extend the resource unit start index field. For example, when the two bits are set, the resource unit start index may equal 128 plus the value of the resource unit start index field. When one bit is set, then one of the two bits may be used to extend the resource unit end index field. When both bits are set, the resource unit end index may be 128 plus the value of the resource unit end index field. The reserved bit may be combined with the bandwidth field to provide a joint indication of the bandwidth field.

In one or more embodiments, still referring to the first option of the modified sounding feedback from STAs, the resource unit starting index field may be redefined by the enhanced signaling device 519 to indicate the starting resource unit index of the first 52-tone resource unit for which an HE beamformer device is requesting feedback. The resource unit end index field may be redefined to indicate the last resource unit index of the first 52-tone resource unit for which the HE beamformer is requesting feedback. One reserved bit may be used to extend the remaining feedback segments field. When the bit is set, the remaining feedback segments field may be 8 plus the value of the remaining feedback segments field. A reserved bit may be used to extend the grouping field. For example, when the bit is set, the grouping field may indicate two additional Ng fields grouped.

In one or more embodiments, a second option for modifying the sounding feedback from STAs may include the enhanced signaling device 519 determining a new compressed beamforming and CQI action frame to enable signaling for operations with 16 antennas and 320 MHz. The new frame may reuse an existing HE frame format or may be different. An entry in the action field of the frame may indicate whether the frame is a next generation compressed beamforming and CQI frame format, which may be according to the format shown in Table 1 above.

In one or more embodiments, still referring to the new compressed beamforming and CQI action frame, for next generation MIMO control, the frame may include a Nc field, a Nr field, a bandwidth field, a grouping field, a codebook information field, a feedback type field, a remaining feedback segments field, a first feedback segment, a resource unit start index, a resource unit end index, a sounding dialog token number field, and other fields. The Nc field may include 3 or 4 bits. The Nr field may include 4 bits. The bandwidth field may include 3 bits. The grouping field may include at least one bit. The codebook information field may include at least one bit. The feedback type field may include at least two bits. The remaining feedback segments field may include at least 4 bits. The first feedback segment field may include at least one bit. The resource unit start index field and the resource unit end index field each may include at least 7 bits. The sounding dialog token number field may include at least 6 bits. The enhanced signaling device 519 may determine the new compressed beamforming and CQI action frame.

It is understood that the above are only a subset of what the enhanced signaling device 519 may be configured to perform and that other functions included throughout this disclosure may also be performed by the enhanced signaling device 519.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may be a device comprising memory and processing circuitry configured to: determine bits indicative of spatial streams; encode the bits, wherein to encode the bits comprises to generate an indication of more than eight spatial streams; determine one or more fields of a frame, wherein the one or more fields comprise the encoded bits; and cause to send the frame.

Example 2 may include the device of example 1 and/or some other example herein, wherein the one or more fields comprise an operating mode control field, wherein the bits consist of three bits, and wherein to generate the indication of the more than eight spatial streams comprises the processing circuitry being further configured to: identify a fourth bit; and generate the indication of the more than eight spatial streams using the operation mode control field and the fourth bit.

Example 3 may include the device of example 1 and/or some other example herein, wherein the frame is an extremely high throughput (EHT) frame, and wherein the EHT frame is an operation mode notification frame, a trigger frame, a null data packet announcement (NDPA) frame, a compressed beamforming report, or a channel quality-only (CQI-only) report frame.

Example 4 may include the device of example 1 and/or some other example herein, wherein the frame is an operation mode notification frame, wherein the one or more fields comprise an operating mode field, and wherein to generate the indication of the more than eight spatial streams comprises the processing circuitry being further configured to: determine one or more bytes; and generate the indication of the more than eight spatial streams using the operating mode field and the one or more bytes.

Example 5 may include the device of example 1 and/or some other example herein, wherein the frame is a trigger frame, wherein the one or more fields comprise a user information field, and wherein to generate the indication of the more than eight spatial streams comprises the processing circuitry being further configured to: identify a fourth bit; and generate the indication of the more than eight spatial streams using the user information field and the fourth bit.

Example 6 may include the device of example 1 and/or some other example herein, wherein the frame is a null data packet announcement (NDPA) frame, wherein the one or more fields comprise a sounding dialog token field, and wherein to generate the indication of the more than eight spatial streams comprises the processing circuitry being further configured to set each of the first two bits of the sounding dialog token field to 1.

Example 7 may include the device of example 1 and/or some other example herein, wherein the one or more fields comprises a spatial stream field, wherein to generate the indication of the more than eight spatial streams comprises the processing circuitry being further configured to apply a scaling factor to the spatial stream field.

Example 8 may include the device of example 1 and/or some other example herein, wherein the frame is a compressed beamforming report frame, a high efficiency (HE) compressed beamforming report, an extremely high throughput (EHT) compressed beamforming report, multi-user (MU) exclusive beamforming report frame, and EHT MU exclusive beamforming report frame, a channel quality-only (CQI-only) report frame, a HE CQI-only report frame, or and EHT CQI-only report frame.

Example 9 may include the device of example 1 and/or some other example herein, wherein the one or more fields further comprise an indication of a bandwidth greater than 160 MHz.

Example 10 may include the device of example 1 and/or some other example herein, wherein the one or more fields comprise an indication of beamforming feedback segments, wherein the one or more frames comprise an indication of a segment of the beamforming feedback segments, and wherein the beamforming feedback segments comprise more than eight segments.

Example 11 may include the device of example 1 and/or some other example herein, wherein the one or more fields comprise an indication that the frame is not intended for a HE or very high throughput (VHT) device.

Example 12 may include the device of example 1 and/or some other example herein, further comprising a transceiver configured to transmit and receive wireless signals, wherein the wireless signals comprise the frame.

Example 13 may include the device of example 12 and/or some other example herein, further comprising one or more antennas coupled to the transceiver.

Example 14 may include a non-transitory computer-readable medium storing computer-executable instructions which when executed by one or more processors result in performing operations comprising: determining bits indicative of spatial streams; encoding the hits, wherein encoding the bits comprises generating an indication of more than eight spatial streams; determining one or more fields of a frame, wherein the one or more fields comprise the encoded bits; and causing to send the frame.

Example 15 may include the non-transitory computer-readable medium of example 14 and/or some other example herein, wherein the one or more fields comprise an operating mode control field, wherein the bits consist of three bits, and wherein generating the indication of the more than eight spatial streams comprises: identifying a fourth bit; and generating the indication of the more than eight spatial streams using the operation mode control field and the fourth bit.

Example 16 may include the non-transitory computer-readable medium of example 14 and/or some other example herein, wherein the one or more fields comprise a control information subfield of a high efficiency (HE) link adaptation (HLA) control field, and wherein generating the indication of the more than eight spatial streams comprises: identifying a fourth bit; and generating the indication of the more than eight spatial streams using the HLA control field and the fourth bit.

Example 17 may include the non-transitory computer-readable medium of example 14 and/or some other example herein, wherein the frame is an operation mode notification frame, wherein the one or more fields comprise an operating mode field, and wherein generating the indication of the more than eight spatial streams comprises: determining one or more bytes; and generating the indication of the more than eight spatial streams using the operating mode field and the one or more bytes.

Example 18 may include the non-transitory computer-readable medium of example 14 and/or some other example herein, wherein the one or more fields comprises a spatial stream field, wherein generating the indication of the more than eight spatial streams comprises applying a scaling factor to the spatial stream field.

Example 19 may include the non-transitory computer-readable medium of example 14 and/or some other example herein, wherein the one or more fields further comprise an indication of a bandwidth greater than 160 MHz.

Example 20 may include a method comprising: determining, by processing circuitry of a device, bits indicative of spatial streams; encoding the bits, by the processing circuitry, wherein encoding the bits comprises generating an indication of more than eight spatial streams; determining, by the processing circuitry, one or more fields of a frame, wherein the one or more fields comprise the encoded bits; and causing to send, by the processing circuitry, the frame.

Example 21 may include an apparatus comprising means for: determining bits indicative of spatial streams; encoding the bits wherein the means for encoding the bits comprises means for generating an indication of more than eight spatial streams; determining one or more fields of a frame, wherein the one or more fields comprise the encoded bits; and causing to send the frame.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

Figure 6:
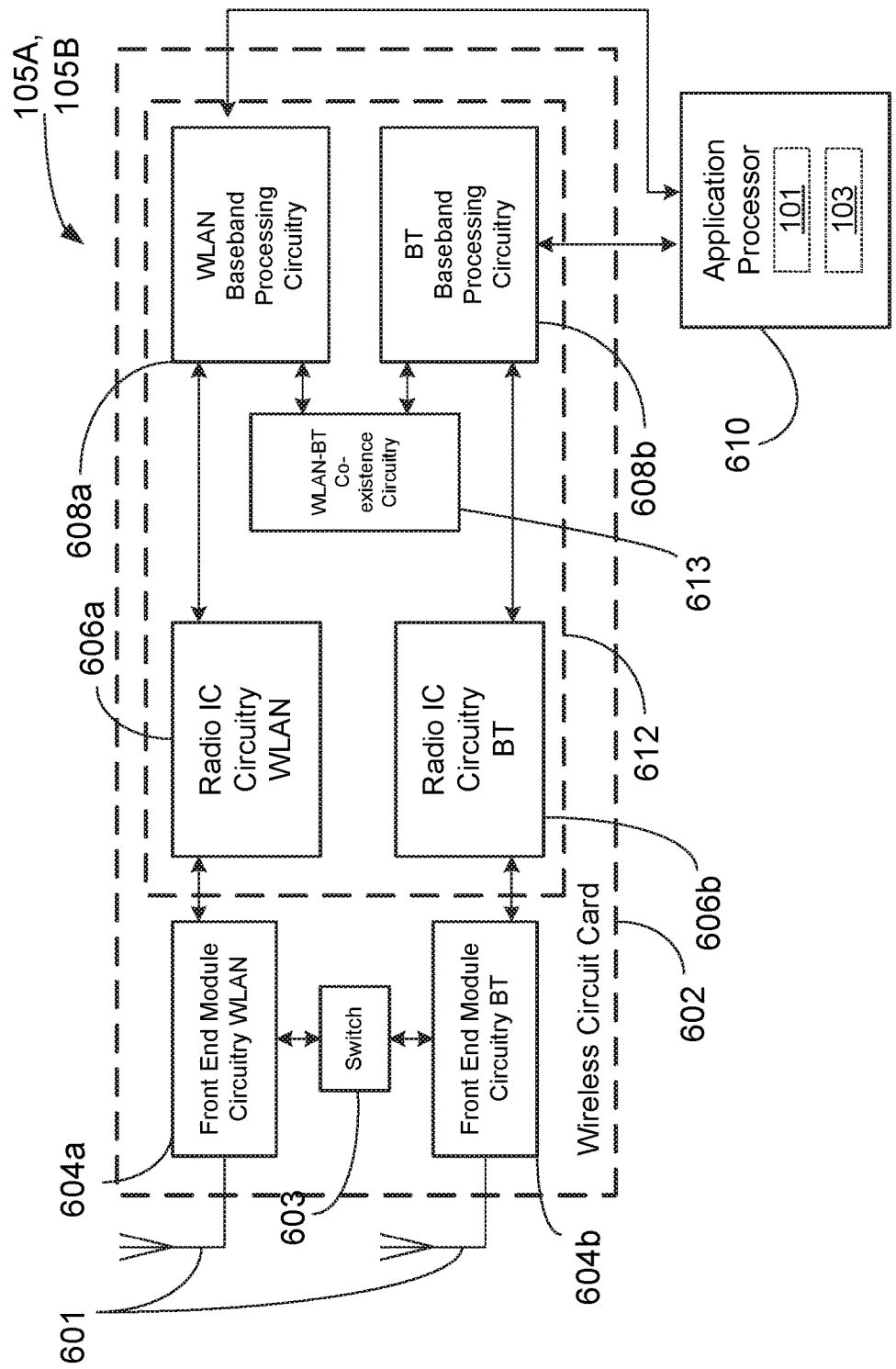
FIG. 6 is a block diagram of a radio architecture in accordance with some examples.

FIG. 6 is a block diagram of a radio architecture 105A, 105B in accordance with some embodiments that may be implemented in any one of the example AP 102 and/or the example user device(s) 120 of FIG. 1. Radio architecture 105A, 105B may include radio front-end module (FEM) circuitry 604a-b, radio IC circuitry 606a-b and baseband processing circuitry 608a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 604a-b may include a WLAN or Wi-Fi FEM circuitry 604a and a Bluetooth (BT) FEM circuitry 604b. The WLAN FEM circuitry 604a may include a receive signal path comprising circuitry configured to operate on WLAN RF signals received from one or more antennas 601, to amplify the received signals and to provide the amplified versions of the received signals to the WLAN radio IC circuitry 606a for further processing. The BT FEM circuitry 604b may include a receive signal path which may include circuitry configured to operate on BT RF signals received from one or more antennas 601, to amplify the received signals and to provide the amplified versions of the received signals to the BT radio IC circuitry 606b for further processing. FEM circuitry 604a may also include a transmit signal path which may include circuitry configured to amplify WLAN signals provided by the radio IC circuitry 606a for wireless transmission by one or more of the antennas 601. In addition, FEM circuitry 604b may also include a transmit signal path which may include circuitry configured to amplify BT signals provided by the radio IC circuitry 606b for wireless transmission by the one or more antennas. In the embodiment of FIG. 6, although FEM 604a and FEM 604b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 606a-b as shown may include WLAN radio IC circuitry 606a and BT radio IC circuitry 606b. The WLAN radio IC circuitry 606a may include a receive signal path which may include circuitry to down-convert WLAN RF signals received from the FEM circuitry 604a and provide baseband signals to WLAN baseband processing circuitry 608a. BT radio IC circuitry 606b may in turn include a receive signal path which may include circuitry to down-convert BT RF signals received from the FEM circuitry 604b and provide baseband signals to BT baseband processing circuitry 608b. WLAN radio IC circuitry 606a may also include a transmit signal path which may include circuitry to up-convert WLAN baseband signals provided by the WLAN baseband processing circuitry 608a and provide WLAN RF output signals to the FEM circuitry 604a for subsequent wireless transmission by the one or more antennas 601. BT radio IC circuitry 606b may also include a transmit signal path which may include circuitry to up-convert BT baseband signals provided by the BT baseband processing circuitry 608b and provide BT RF output signals to the FEM circuitry 604b for subsequent wireless transmission by the one or more antennas 601. In the embodiment of FIG. 6, although radio IC circuitries 606a and 606b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 608a-b may include a WLAN baseband processing circuitry 608a and a BT baseband processing circuitry 608b. The WLAN baseband processing circuitry 608a may include a memory, such as, for example, a set of RAM arrays in a Fast Fourier Transform or Inverse Fast Fourier Transform block (not shown) of the WLAN baseband processing circuitry 608a. Each of the WLAN baseband circuitry 608a and the BT baseband circuitry 608b may further include one or more processors and control logic to process the signals received from the corresponding WLAN or BT receive signal path of the radio IC circuitry 606a-b, and to also generate corresponding WLAN or BT baseband signals for the transmit signal path of the radio IC circuitry 606a-b. Each of the baseband processing circuitries 608a and 608b may further include physical layer (PHY) and medium access control layer (MAC) circuitry, and may further interface with a device for generation and processing of the baseband signals and for controlling operations of the radio IC circuitry 606a-b.

Referring still to FIG. 6, according to the shown embodiment, WLAN-BT coexistence circuitry 613 may include logic providing an interface between the WLAN baseband circuitry 608a and the BT baseband circuitry 608b to enable use cases requiring WLAN and BT coexistence. In addition, a switch 603 may be provided between the WLAN FEM circuitry 604a and the BT FEM circuitry 604b to allow switching between the WLAN and BT radios according to application needs. In addition, although the antennas 601 are depicted as being respectively connected to the WLAN FEM circuitry 604a and the BT FEM circuitry 604b, embodiments include within their scope the sharing of one or more antennas as between the WLAN and BT FEMs, or the provision of more than one antenna connected to each of FEM 604a or 604b.

In some embodiments, the front-end module circuitry 604a-b, the radio IC circuitry 606a-b, and baseband processing circuitry 608a-b may be provided on a single radio card, such as wireless radio card 602. In some other embodiments, the one or more antennas 601, the FEM circuitry 604a-b and the radio IC circuitry 606a-b may be provided on a single radio card. In some other embodiments, the radio IC circuitry 606a-b and the baseband processing circuitry 608a-b may be provided on a single chip or integrated circuit (IC), such as IC 612.

In some embodiments, the wireless radio card 602 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 702.11n-2009, IEEE 702.11-2012, IEEE 702.11-2016, 702.11n-2009, 702.11ac, 702.11ah, 702.11ad, 702.11ay and/or 702.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 702.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the BT baseband circuitry 608b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 702.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 7:
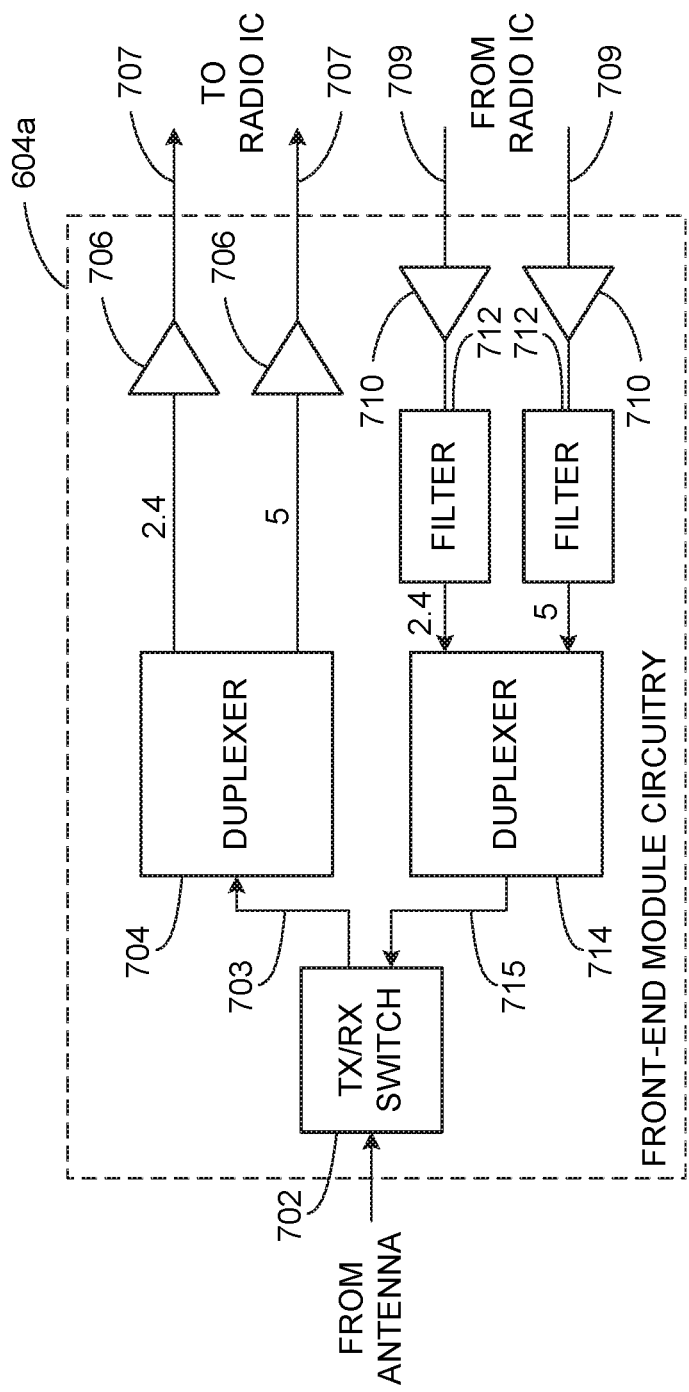
FIG. 7 illustrates an example front-end module circuitry for use in the radio architecture of FIG. 6, in accordance with one or more example embodiments of the present disclosure.

FIG. 7 illustrates WLAN FEM circuitry 604a in accordance with some embodiments. Although the example of FIG. 7 is described in conjunction with the WLAN FEM circuitry 604a, the example of FIG. 7 may be described in conjunction with the example BT FEM circuitry 604b (FIG. 6), although other circuitry configurations may also be suitable.

In some embodiments, the FEM circuitry 604a may include a TX/RX switch 702 to switch between transmit mode and receive mode operation. The FEM circuitry 604a may include a receive signal path and a transmit signal path. The receive signal path of the FEM circuitry 604a may include a low-noise amplifier (LNA) 706 to amplify received RF signals 703 and provide the amplified received RF signals 707 as an output (e.g., to the radio IC circuitry 606a-b (FIG. 6)). The transmit signal path of the circuitry 604a may include a power amplifier (PA) to amplify input RF signals 709 (e.g., provided by the radio IC circuitry 606a-b), and one or more filters 712, such as band-pass filters (BPFs), low-pass filters (LPFs) or other types of filters, to generate RF signals 715 for subsequent transmission (e.g., by one or more of the antennas 601 (FIG. 6)) via an example duplexer 714.

In some dual-mode embodiments for Wi-Fi communication, the FEM circuitry 604a may be configured to operate in either the 2.4 GHz frequency spectrum or the 5 GHz frequency spectrum. In these embodiments, the receive signal path of the FEM circuitry 604a may include a receive signal path duplexer 704 to separate the signals from each spectrum as well as provide a separate LNA 706 for each spectrum as shown. In these embodiments, the transmit signal path of the FEM circuitry 604a may also include a power amplifier 710 and a filter 712, such as a BPF, an LPF or another type of filter for each frequency spectrum and a transmit signal path duplexer 704 to provide the signals of one of the different spectrums onto a single transmit path for subsequent transmission by the one or more of the antennas 601 (FIG. 6). In some embodiments, BT communications may utilize the 2.4 GHz signal paths and may utilize the same FEM circuitry 604a as the one used for WLAN communications.

Figure 8:
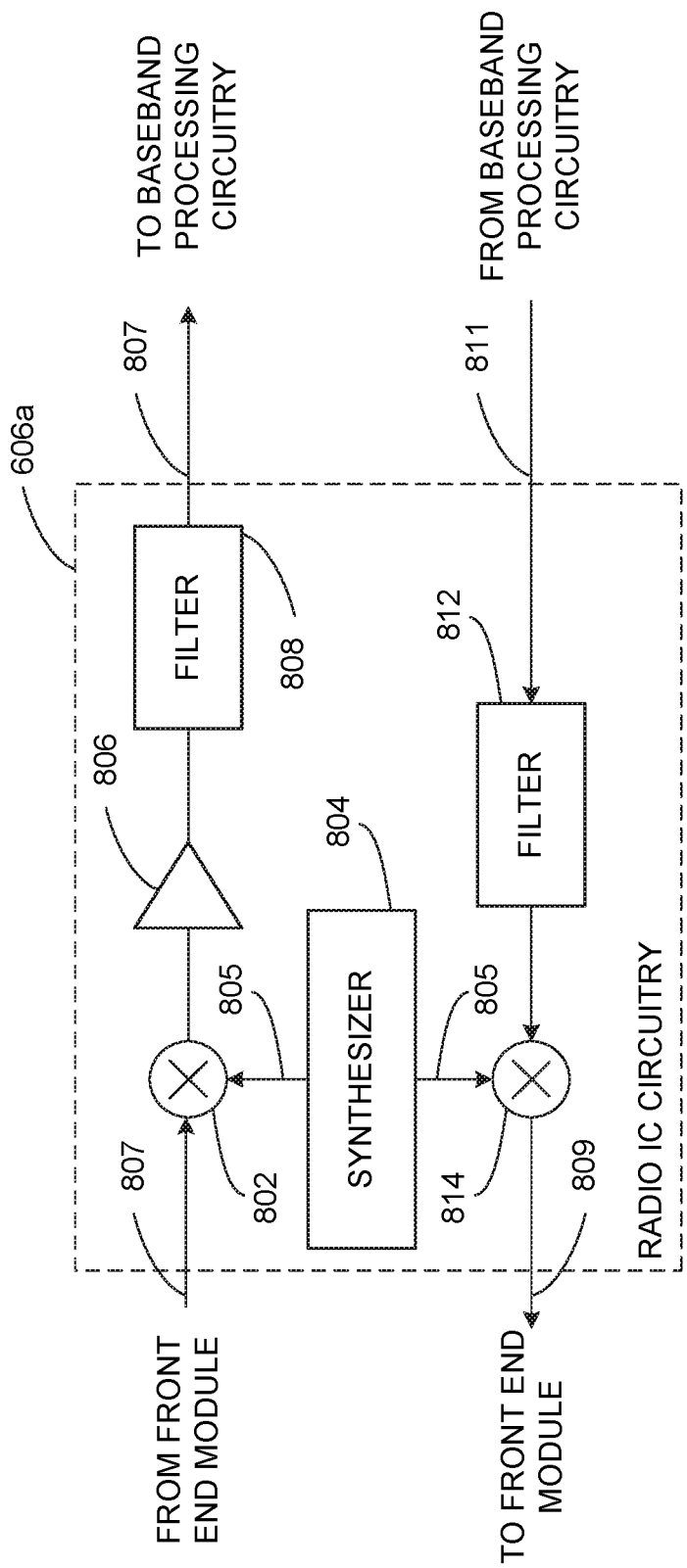
FIG. 8 illustrates an example radio IC circuitry for use in the radio architecture of FIG. 6, in accordance with one or more example embodiments of the present disclosure.

FIG. 8 illustrates radio IC circuitry 606a in accordance with some embodiments. The radio IC circuitry 606a is one example of circuitry that may be suitable for use as the WLAN or BT radio IC circuitry 606a/606b (FIG. 6), although other circuitry configurations may also be suitable. Alternatively, the example of FIG. 8 may be described in conjunction with the example BT radio IC circuitry 606b.

In some embodiments, the radio IC circuitry 606a may include a receive signal path and a transmit signal path. The receive signal path of the radio IC circuitry 606a may include at least mixer circuitry 802, such as, for example, down-conversion mixer circuitry, amplifier circuitry 806 and filter circuitry 808. The transmit signal path of the radio IC circuitry 606a may include at least filter circuitry 812 and mixer circuitry 814, such as, for example, up-conversion mixer circuitry. Radio IC circuitry 606a may also include synthesizer circuitry 804 for synthesizing a frequency 805 for use by the mixer circuitry 802 and the mixer circuitry 814. The mixer circuitry 802 and/or 814 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 8 illustrates only a simplified version of a radio IC circuitry, and may include, although not shown, embodiments where each of the depicted circuitries may include more than one component. For instance, mixer circuitry 814 may each include one or more mixers, and filter circuitries 808 and/or 812 may each include one or more filters, such as one or more BPFs and/or LPFs according to application needs. For example, when mixer circuitries are of the direct-conversion type, they may each include two or more mixers.

In some embodiments, mixer circuitry 802 may be configured to down-convert RF signals 707 received from the FEM circuitry 604a-b (FIG. 6) based on the synthesized frequency 805 provided by synthesizer circuitry 804. The amplifier circuitry 806 may be configured to amplify the down-converted signals and the filter circuitry 808 may include an LPF configured to remove unwanted signals from the down-converted signals to generate output baseband signals 807. Output baseband signals 807 may be provided to the baseband processing circuitry 608a-b (FIG. 6) for further processing. In some embodiments, the output baseband signals 807 may be zero-frequency baseband signals, although this is not a requirement. In some embodiments, mixer circuitry 802 may comprise passive mixers, although the scope of the embodiments is not limited in this respect.

In some embodiments, the mixer circuitry 814 may be configured to up-convert input baseband signals 811 based on the synthesized frequency 805 provided by the synthesizer circuitry 804 to generate RF output signals 709 for the FEM circuitry 604a-b. The baseband signals 811 may be provided by the baseband processing circuitry 608a-b and may be filtered by filter circuitry 812. The filter circuitry 812 may include an LPF or a BPF, although the scope of the embodiments is not limited in this respect.

In some embodiments, the mixer circuitry 802 and the mixer circuitry 814 may each include two or more mixers and may be arranged for quadrature down-conversion and/or up-conversion respectively with the help of synthesizer 804. In some embodiments, the mixer circuitry 802 and the mixer circuitry 814 may each include two or more mixers each configured for image rejection (e.g., Hartley image rejection). In some embodiments, the mixer circuitry 802 and the mixer circuitry 814 may be arranged for direct down-conversion and/or direct up-conversion, respectively. In some embodiments, the mixer circuitry 802 and the mixer circuitry 814 may be configured for super-heterodyne operation, although this is not a requirement.

Mixer circuitry 802 may comprise, according to one embodiment: quadrature passive mixers (e.g., for the in-phase (I) and quadrature phase (Q) paths). In such an embodiment, RF input signal 707 from FIG. 8 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 805 of synthesizer 804 (FIG. 8). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 707 (FIG. 7) may comprise a balanced signal, although the scope of the embodiments is not limited in this respect. The I and Q baseband output signals may be provided to low-noise amplifier, such as amplifier circuitry 806 (FIG. 8) or to filter circuitry 808 (FIG. 8).

In some embodiments, the output baseband signals 807 and the input baseband signals 811 may be analog baseband signals, although the scope of the embodiments is not limited in this respect. In some alternate embodiments, the output baseband signals 807 and the input baseband signals 811 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 804 may be a fractional-N synthesizer or a fractional N/N+1 synthesizer, although the scope of the embodiments is not limited in this respect as other types of frequency synthesizers may be suitable. For example, synthesizer circuitry 804 may be a delta-sigma synthesizer, a frequency multiplier, or a synthesizer comprising a phase-locked loop with a frequency divider. According to some embodiments, the synthesizer circuitry 804 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 804 may be provided by a voltage controlled oscillator (VCO), although that is not a requirement. A divider control input may further be provided by either the baseband processing circuitry 608*a-b* (FIG. 6) depending on the desired output frequency 805. In some embodiments, a divider control input (e.g., N) may be determined from a look-up table (e.g., within a Wi-Fi card) based on a channel number and a channel center frequency as determined or indicated by the example application processor 610. The application processor 610 may include, or otherwise be connected to, one of the example secure signal converter 101 or the example received signal converter 103 (e.g., depending on which device the example radio architecture is implemented in).

In some embodiments, synthesizer circuitry 804 may be configured to generate a carrier frequency as the output frequency 805, while in other embodiments, the output frequency 805 may be a fraction of the carrier frequency (e.g., one-half the carrier frequency, one-third the carrier frequency). In some embodiments, the output frequency 805 may be a LO frequency (fLO).

Figure 9:
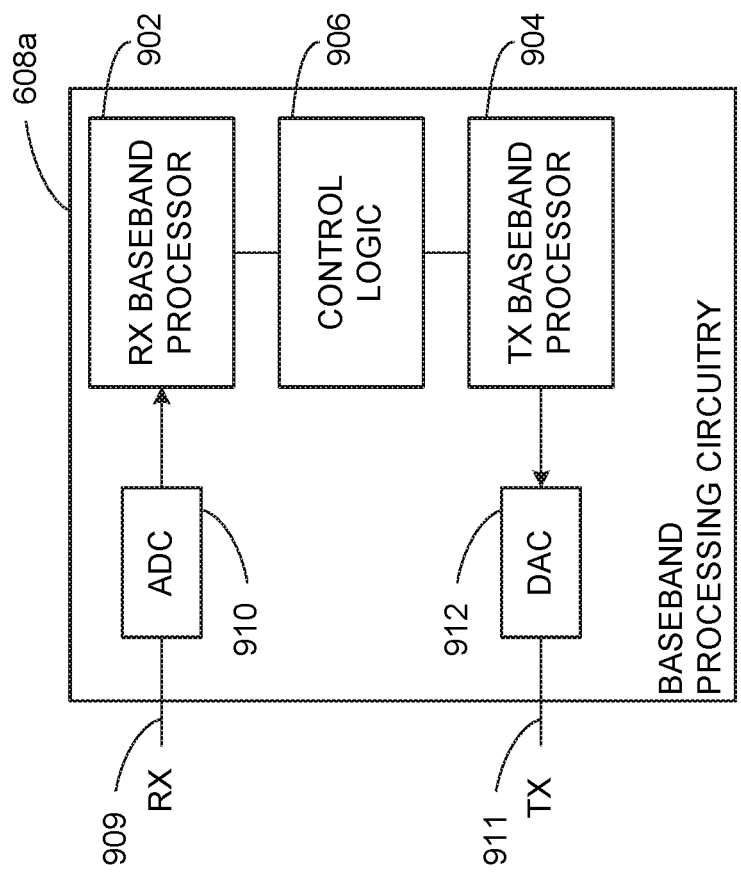
FIG. 9 illustrates an example baseband processing circuitry for use in the radio architecture of FIG. 6, in accordance with one or more example embodiments of the present disclosure.

FIG. 9 illustrates a functional block diagram of baseband processing circuitry 608*a* in accordance with some embodiments. The baseband processing circuitry 608*a* is one example of circuitry that may be suitable for use as the baseband processing circuitry 608*a* (FIG. 6), although other circuitry configurations may also be suitable. Alternatively, the example of FIG. 8 may be used to implement the example BT baseband processing circuitry 608*b* of FIG. 6.

The baseband processing circuitry 608*a* may include a receive baseband processor (RX BBP) 902 for processing receive baseband signals 809 provided by the radio IC circuitry 606*a-b* (FIG. 6) and a transmit baseband processor (TX BBP) 904 for generating transmit baseband signals 811 for the radio IC circuitry 606*a-b*. The baseband processing circuitry 608*a* may also include control logic 906 for coordinating the operations of the baseband processing circuitry 608*a*.

In some embodiments (e.g., when analog baseband signals are exchanged between the baseband processing circuitry 608*a-b* and the radio IC circuitry 606*a-b*), the baseband processing circuitry 608*a* may include ADC 910 to convert analog baseband signals 909 received from the radio IC circuitry 606*a-b* to digital baseband signals for processing by the RX BBP 902. In these embodiments, the baseband processing circuitry 608*a* may also include DAC 912 to convert digital baseband signals from the TX BBP 904 to analog baseband signals 911.

In some embodiments that communicate OFDM signals or OFDMA signals, such as through baseband processor 608*a*, the transmit baseband processor 904 may be configured to generate OFDM or OFDMA signals as appropriate for transmission by performing an inverse fast Fourier transform (IFFT). The receive baseband processor 902 may be configured to process received OFDM signals or OFDMA signals by performing an FFT. In some embodiments, the receive baseband processor 902 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 6, in some embodiments, the antennas 601 (FIG. 6) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 601 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

What is claimed is:

1. A device, the device comprising storage coupled to processing circuitry, the processing circuitry configured to:
   determine four bits indicative of spatial streams;
   encode the four bits, wherein to encode the four bits comprises to generate a first indication of a first number of spatial streams up to eight spatial streams using three of the four bits, and a second indication of a second number of either zero or eight additional spatial streams using a fourth bit of the four bits, wherein the first indication of the first number of spatial streams is encoded in a Control Information subfield of an Operating Mode Control Field, the Control Information subfield comprising a Channel Width indication and a Disable Uplink Multi-User indication;
   determine one or more fields of a frame, wherein the one or more fields comprise the Operating Mode Control Field; and
   cause to send the frame, the frame comprising the four encoded bits.

2. The device of claim 1, wherein a second field different than the Operating Mode Control Field comprises the fourth bit.

3. The device of claim 1, wherein the frame is an extremely high throughput (EHT) frame, and wherein the EHT frame is an operation mode notification frame, a trigger frame, a null data packet announcement (NDPA) frame, a compressed beamforming report, or a channel quality-only (CQI-only) report frame.

4. The device of claim 1, wherein the frame is an operation mode notification frame, wherein a second field different than the Operating Mode Control Field comprises one or more bytes, the one or more bytes comprising the fourth bit.

5. The device of claim 1, wherein the frame is a trigger frame, wherein the one or more fields comprise a user information field comprising the three bits, and wherein a second field different than the user information field comprises the fourth bit.

6. The device of claim 1, wherein the frame is a null data packet announcement (NDPA) frame, wherein the one or more fields comprise a sounding dialog token field, wherein a second field different than the sounding dialog token field comprises the fourth bit, and wherein the processing circuitry is further configured to set each of the first two bits of the sounding dialog token field to 1.

7. The device of claim 1, wherein the one or more fields comprises a spatial stream field, and wherein the processing circuitry is further configured to apply a scaling factor to the spatial stream field to indicate more than eight spatial streams.

8. The device of claim 1, wherein the frame is a compressed beamforming report frame, a high efficiency (HE) compressed beamforming report, an extremely high throughput (EHT) compressed beamforming report, multi-user (MU) exclusive beamforming report frame, and EHT MU exclusive beamforming report frame, a channel quality-only (CQI-only) report frame, a HE CQI-only report frame, or an EHT CQI-only report frame.

9. The device of claim 1, wherein the one or more fields further comprise an indication of a bandwidth greater than 160 MHz.

10. The device of claim 1, wherein the one or more fields comprise an indication of beamforming feedback segments, wherein the one or more frames comprise an indication of a segment of the beamforming feedback segments, and wherein the beamforming feedback segments comprise more than eight segments.

11. The device of claim 1, wherein the one or more fields comprise an indication that the frame is not intended for a HE or very high throughput (VHT) device.

12. The device of claim 1, further comprising one or more transceivers configured to transmit and receive wireless signals, wherein the wireless signals comprise the frame.

13. The device of claim 12, further comprising one or more antennas coupled to the one or more transceivers.

14. A non-transitory computer-readable medium storing computer-executable instructions which when executed by one or more processors result in performing operations comprising:
determining four bits indicative of spatial streams;
encoding the four bits, wherein encoding the four bits comprises generating a first indication of a first number of spatial streams up to eight spatial streams using three of the four bits, and a second indication of a second number of either zero or eight additional spatial streams using a fourth bit of the four bits, wherein the first indication of the first number of spatial streams is encoded in a Control Information subfield of an Operating Mode Control Field, the Control Information subfield comprising a Channel Width indication and a Disable Uplink Multi-User indication;
determining one or more fields of a frame, wherein the one or more fields comprise the Operating Mode Control Field; and
causing to send the frame, the frame comprising the four encoded bits.

15. The non-transitory computer-readable medium of claim 14, wherein the one or more fields comprise an operating mode control field comprising the three bits, and wherein a second field different than the operating mode control field comprises the fourth bit.

16. The non-transitory computer-readable medium of claim 14, wherein the one or more fields comprise a control information subfield of a high efficiency (HE) link adaptation (HLA) control field, and wherein a second field different than the HLA control field comprises the fourth bit.

17. The non-transitory computer-readable medium of claim 14, wherein the frame is an operation mode notification frame, wherein the one or more fields comprise an operating mode field, and wherein a second field different than the operating mode field comprises one or more bytes, the one or more bytes comprising the fourth bit.

18. The non-transitory computer-readable medium of claim 14, wherein the one or more fields comprises a spatial stream field, the operations further comprising applying a scaling factor to the spatial stream field to indicate more than eight spatial streams.

19. The non-transitory computer-readable medium of claim 14, wherein the one or more fields further comprise an indication of a bandwidth greater than 160 MHz.

20. A method comprising:
determining, by processing circuitry of a device, four bits indicative of spatial streams;
encoding the four bits, by the processing circuitry, wherein encoding the four bits comprises generating a first indication of a first number of spatial streams up to eight spatial streams using three of the four bits, and a second indication of a second number of either zero or eight additional spatial streams using a fourth bit of the four bits, wherein the first indication of the first number of spatial streams is encoded in a Control Information subfield of an Operating Mode Control Field, the Control Information subfield comprising a Channel Width indication and a Disable Uplink Multi-User indication;
determining, by the processing circuitry, one or more fields of a frame, wherein the one or more fields comprise the Operating Mode Control Field; and
causing to send, by the processing circuitry, the frame, the frame comprising the four encoded bits.

* * * * *